United States Patent
Hattori et al.

(10) Patent No.: US 11,536,877 B2
(45) Date of Patent: *Dec. 27, 2022

(54) LAMINATED OPTICAL FILM, METHOD OF PRODUCING LAMINATED OPTICAL FILM, OPTICAL ELEMENT, AND IMAGE DISPLAY

(71) Applicant: Nitto Denko Corporation, Ibaraki (JP)

(72) Inventors: Daisuke Hattori, Ibaraki (JP); Kozo Nakamura, Ibaraki (JP); Kazuhito Hosokawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/754,406

(22) PCT Filed: Jul. 29, 2016

(86) PCT No.: PCT/JP2016/072452
§ 371 (c)(1),
(2) Date: Feb. 22, 2018

(87) PCT Pub. No.: WO2017/033672
PCT Pub. Date: Mar. 2, 2017

(65) Prior Publication Data
US 2018/0239062 A1 Aug. 23, 2018

(30) Foreign Application Priority Data

Aug. 24, 2015 (JP) .................................. 2015-165291
Sep. 7, 2015 (JP) .................................. 2015-176210
Jul. 28, 2016 (JP) ............................. JP2016-149062

(51) Int. Cl.
*G02B 1/14* (2015.01)
*B32B 5/18* (2006.01)
(Continued)

(52) U.S. Cl.
CPC .................. *G02B 1/14* (2015.01); *B32B 5/18* (2013.01); *C08J 7/042* (2013.01); *C08J 7/043* (2020.01);
(Continued)

(58) Field of Classification Search
CPC .... G02B 1/14; B32B 5/18; B32B 7/02; B32B 27/26; B32B 27/08; B32B 2305/026; B32B 2551/00; C08J 7/042; C08J 7/046
See application file for complete search history.

(56) References Cited

U.S. PATENT DOCUMENTS 2,870,109 A 1/1959 Nickerson
4,408,009 A 10/1983 Mallon
(Continued)

FOREIGN PATENT DOCUMENTS

CN 1032503 A 4/1989
CN 1221629 A 7/1999
(Continued)

OTHER PUBLICATIONS

Translation of JP 2013 083722, Kimura et al., May 9, 2013, p. 1-38. (Year: 2013).*
(Continued)

Primary Examiner — Hai Vo
(74) Attorney, Agent, or Firm — WHDA, LLP

(57) ABSTRACT

The present invention is intended to provide a laminated optical film achieving both a high proportion of void space (porosity) and superior abrasion resistance. The laminated optical film of the present invention includes: a void-provided layer; a resin film; and a cover layer, wherein the void-provided layer is formed on the resin film, the cover layer is formed directly on the void-provided layer, and the void-provided layer has a contact angle with water of 90° or more and a proportion of void space of 30 vol % or more.

12 Claims, 3 Drawing Sheets

(51) Int. Cl.
*B32B 7/02* (2019.01)
*C08J 7/043* (2020.01)
*C08J 7/046* (2020.01)
*C08J 7/056* (2020.01)
*C08J 7/04* (2020.01)
*G02B 1/111* (2015.01)

(52) U.S. Cl.
CPC .............. *C08J 7/046* (2020.01); *C08J 7/056* (2020.01); *C08J 2367/02* (2013.01); *C08J 2429/04* (2013.01); *G02B 1/111* (2013.01)

(56) References Cited

U.S. PATENT DOCUMENTS

| | | | |
|---|---|---|---|
| 5,124,188 | A | 6/1992 | Roe et al. |
| 5,676,938 | A | 10/1997 | Kimura et al. |
| 5,844,060 | A | 12/1998 | Furuya et al. |
| 5,948,314 | A | 9/1999 | Geiss et al. |
| 5,948,482 | A | 9/1999 | Brinker et al. |
| 6,251,523 | B1 | 6/2001 | Takahashi et al. |
| 6,265,516 | B1 | 7/2001 | Okawa et al. |
| 6,300,385 | B1 | 10/2001 | Hashida et al. |
| 7,960,029 | B2 | 6/2011 | Kai et al. |
| 8,124,224 | B2 | 2/2012 | Kato et al. |
| 8,488,082 | B2 * | 7/2013 | Nishiguchi .......... G02B 5/3016 349/96 |
| 10,472,483 | B2 | 11/2019 | Haruta et al. |
| 2001/0003358 | A1 | 6/2001 | Terase et al. |
| 2003/0023021 | A1 | 1/2003 | Sakuma |
| 2003/0134124 | A1 | 7/2003 | Ochiai |
| 2004/0114248 | A1 | 6/2004 | Hokazono et al. |
| 2004/0132846 | A1 | 7/2004 | Leventis et al. |
| 2004/0216641 | A1 | 11/2004 | Hamada et al. |
| 2004/0253427 | A1 | 12/2004 | Yokogawa et al. |
| 2005/0038137 | A1 | 2/2005 | Yoshihara et al. |
| 2005/0162743 | A1 | 7/2005 | Yano et al. |
| 2005/0165197 | A1 | 7/2005 | Ogihara et al. |
| 2005/0195486 | A1 | 9/2005 | Sasaki et al. |
| 2006/0093786 | A1 | 5/2006 | Ohashi et al. |
| 2006/0164740 | A1 | 7/2006 | Sone et al. |
| 2006/0239886 | A1 | 10/2006 | Nakayama et al. |
| 2006/0269724 | A1 | 11/2006 | Ohashi et al. |
| 2006/0269733 | A1 | 11/2006 | Mizuno et al. |
| 2006/0281828 | A1 | 12/2006 | Nakayama et al. |
| 2007/0196667 | A1 | 8/2007 | Asai |
| 2007/0206283 | A1 | 9/2007 | Ohtani et al. |
| 2007/0248828 | A1 | 10/2007 | Yoneyama et al. |
| 2008/0075895 | A1 | 3/2008 | Yamaki et al. |
| 2008/0171188 | A1 | 7/2008 | Van Baak et al. |
| 2008/0290472 | A1 | 11/2008 | Yagihashi et al. |
| 2008/0311398 | A1 | 12/2008 | Bauer et al. |
| 2008/0316602 | A1 | 12/2008 | Kameshima et al. |
| 2009/0202802 | A1 | 8/2009 | Seong et al. |
| 2009/0244709 | A1 | 10/2009 | Suzuki et al. |
| 2010/0102251 | A1 | 4/2010 | Ferrini et al. |
| 2010/0160577 | A1 | 6/2010 | Hirano |
| 2010/0246014 | A1 | 9/2010 | Asahi et al. |
| 2010/0256321 | A1 | 10/2010 | Kim et al. |
| 2011/0033398 | A1 | 2/2011 | Cauvin et al. |
| 2011/0195239 | A1 * | 8/2011 | Takane .................... C09D 7/61 428/206 |
| 2011/0224308 | A1 | 9/2011 | Saito et al. |
| 2012/0038990 | A1 | 2/2012 | Hao et al. |
| 2013/0202867 | A1 | 8/2013 | Coggio et al. |
| 2013/0265477 | A1 | 10/2013 | Furusato et al. |
| 2013/0337161 | A1 | 12/2013 | Akimoto et al. |
| 2014/0009835 | A1 | 1/2014 | Shibuya et al. |
| 2014/0371317 | A1 | 12/2014 | Aliyar et al. |
| 2015/0037535 | A1 | 2/2015 | Akimoto et al. |
| 2015/0037605 | A1 | 2/2015 | Oser et al. |
| 2015/0166353 | A1 | 6/2015 | Kobayashi et al. |
| 2016/0025899 | A1 | 1/2016 | Ishizeki et al. |
| 2016/0131819 | A1 | 5/2016 | Musashi et al. |
| 2016/0170094 | A1 | 6/2016 | Nakayama et al. |
| 2016/0194451 | A1 | 7/2016 | Yoshida et al. |
| 2016/0304722 | A1 | 10/2016 | Kobori |
| 2017/0183542 | A1 | 6/2017 | Kato et al. |
| 2017/0341336 | A1 | 11/2017 | Haruta et al. |
| 2017/0342232 | A1 | 11/2017 | Haruta et al. |
| 2018/0002508 | A1 | 1/2018 | Hattori et al. |
| 2018/0215124 | A1 | 8/2018 | Hattori et al. |
| 2018/0223061 | A1 | 8/2018 | Hattori et al. |
| 2018/0224580 | A1 | 8/2018 | Hattori et al. |

FOREIGN PATENT DOCUMENTS

| | | | |
|---|---|---|---|
| CN | 1256381 | A | 6/2000 |
| CN | 1275589 | A | 12/2000 |
| CN | 1544324 | A | 11/2004 |
| CN | 1646947 | A | 7/2005 |
| CN | 1809764 | A | 7/2006 |
| CN | 1842727 | A | 10/2006 |
| CN | 101007911 | A | 8/2007 |
| CN | 101128752 | A | 2/2008 |
| CN | 101792529 | A | 8/2010 |
| CN | 102186668 | A | 9/2011 |
| CN | 102460244 | A | 5/2012 |
| CN | 102712140 | A | 10/2012 |
| CN | 102736135 | A | 10/2012 |
| CN | 103168257 | A | 6/2013 |
| CN | 103185905 | A | 7/2013 |
| CN | 103213996 | A | 7/2013 |
| CN | 103660513 | A | 3/2014 |
| CN | 103738971 | A | 4/2014 |
| EP | 1031612 | A2 | 2/1999 |
| EP | 3 235 638 | A1 | 10/2017 |
| EP | 3239221 | A1 | 11/2017 |
| EP | 3239257 | A1 | 11/2017 |
| EP | 3246355 | A1 | 11/2017 |
| JP | 61-250032 | A | 11/1986 |
| JP | 5-506681 | A | 9/1993 |
| JP | H07-48527 | A | 2/1995 |
| JP | H07-133105 | A | 5/1995 |
| JP | 9-24575 | A | 1/1997 |
| JP | H10-508049 | A | 8/1998 |
| JP | H11-292568 | A | 10/1999 |
| JP | 2000-119433 | A | 4/2000 |
| JP | 2000-256040 | A | 9/2000 |
| JP | 2000-264620 | A | 9/2000 |
| JP | 2000-284102 | A | 10/2000 |
| JP | 2001-163613 | A | 6/2001 |
| JP | 2002-311204 | A | 10/2002 |
| JP | 2003-216061 | A | 7/2003 |
| JP | 2004-10424 | A | 1/2004 |
| JP | 2004-300172 | A | 10/2004 |
| JP | 2004-323752 | A | 11/2004 |
| JP | 2004-354699 | A | 12/2004 |
| JP | 2005-148623 | A | 6/2005 |
| JP | 2005-154195 | A | 6/2005 |
| JP | 2005-350519 | A | 12/2005 |
| JP | 2006-11175 | A | 1/2006 |
| JP | 2006-96019 | A | 4/2006 |
| JP | 2006-96967 | A | 4/2006 |
| JP | 2006-221144 | A | 8/2006 |
| JP | 2006-255496 | A | 9/2006 |
| JP | 2006-297329 | A | 11/2006 |
| JP | 2007-014946 | A | 1/2007 |
| JP | 2008-40171 | A | 2/2008 |
| JP | 2008-205008 | A | 9/2008 |
| JP | 2008-214569 | A | 9/2008 |
| JP | 2008-291074 | A | 12/2008 |
| JP | 2009-503226 | A | 1/2009 |
| JP | 2009-258711 | A | 11/2009 |
| JP | 2010-256880 | A | 11/2010 |
| JP | 2012-91943 | A | 5/2012 |
| JP | 2012-189802 | A | 10/2012 |
| JP | 2012-524299 | A | 10/2012 |
| JP | 2012-228878 | A | 11/2012 |
| JP | 2013-7831 | A | 1/2013 |
| JP | 2013-60309 | A | 4/2013 |
| JP | 2013083722 | A * | 5/2013 |
| JP | 2014-46518 | A | 3/2014 |
| JP | 2014-122309 | A | 7/2014 |

(56) References Cited

FOREIGN PATENT DOCUMENTS

| | | | |
|---|---|---|---|
| JP | 2015-028540 A | 2/2015 |
| JP | 2015-064607 A | 4/2015 |
| JP | 2016-104551 A | 6/2016 |
| KR | 10-2003-0040065 A | 5/2003 |
| KR | 10-2004-0044532 A | 5/2004 |
| KR | 10-2007-0011303 A | 1/2007 |
| KR | 10-2007-0022059 A | 2/2007 |
| KR | 10-2009-0006784 A | 1/2009 |
| TW | 213860 B | 10/1993 |
| TW | 200300157 A | 5/2003 |
| TW | 200844194 A | 11/2008 |
| TW | 201447389 A | 12/2014 |
| TW | 201447402 A | 12/2014 |
| WO | 2010/120845 A2 | 10/2010 |
| WO | 2010/120971 A1 | 10/2010 |
| WO | 2011/088161 A1 | 7/2011 |
| WO | 2012/115057 A1 | 8/2012 |
| WO | 2012/124693 A1 | 9/2012 |
| WO | 2014/034588 A1 | 3/2014 |
| WO | 2014/175124 A1 | 10/2014 |
| WO | 2015/041257 A1 | 3/2015 |
| WO | 2016/104762 A1 | 6/2016 |

OTHER PUBLICATIONS

Non-Final Office Action dated Jul. 10, 2019, issued in U.S. Appl. No. 15/539,928 (36 pages).
Office Action dated Jun. 28, 2019, issued in CN application No. 201580071024.9 (counterpart to U.S. Appl. No. 15/539,928:), with partial machine translation. (12 pages).
Office Action dated Jul. 1, 2019, issued in counterpart CN application No. 201680043414.X, with partial machine translation. (15 pages).
Office Action dated Jun. 26, 2019, issued in TW application No. 104143838 (counterpart to U.S. Appl. No. 15/539,946), with partial English translation. (15 pages).
Office Action dated Aug. 6, 2019, issued in JP application No. 2019-133188 (counterpart to U.S. Appl. No. 15/539,946), with partial English translation. (7 pages).
Office Action dated Jul. 2, 2019, issued in TW application No. 2016800376799 (counterpart to U.S. Appl. No. 15/539,926), with partial English translation. (11 pages).
Search Report dated May 31, 2019, issued in CN application No. 2016800376799 (counterpart to U.S. Appl. No. 15/749,148). (1 pages).
Non-Final Office Action dated Jun. 18, 2018, issued in U.S. Appl. No. 15/539,926.
"What is Aerogel?" (Year:2008), cited in Non-Final Office Action dated Jun. 18, 2018, https;//web.archive.org/web/20080621095754/http://www.aerogel org/?p=3.
Extended European Search Report dated Jun. 14, 2018, issued in European Patent Application No. 15873333.7 (Corresponds to U.S. Appl. No. 15/539,927).
Markus Börner et al., "Cross-Linked Monolithic Xerogels Based on Silica Nanoparticles", Chemistry of Materials, 2013, pp. 3648-3653.
Baris R. Mutiu et al., Silicon alkoxide cross-linked silica nanoparticles gels for encapsulation of bacterial biocatalysts, Journal of Materials Chemistry A., 2013.
Extended European Search Report dated Jun. 27, 2018, issued in Application No. 15873330.3 (Corresponds to U.S. Appl. No. 15/539,926).
Non-Final Office Action dated Jul. 27, 2018, issued in U.S. Appl. No. 15/539,927.
Extended European Search Report dated Aug. 13, 2018, issued in Application No. 15873332.9(Corresponds to U.S. Appl. No. 15/539,928).
Non-Final Office Action dated Jan. 24, 2020, issued in U.S. Appl. No. 15/539,946. (63 pages).
Office Action dated Dec. 24, 2019, issued in counterpart JP application No. 2016-149062, with English translation. (6 pages).
Office Action dated Jan. 7, 2020, issued in JP application No. 2016-149060 (counterpart to U.S. Appl. No. 15/749,250), with English translation. (12 pages).
Office Action dated Jan. 7, 2020, issued in JP application No. 2016-149061 (counterpart to U.S. Appl. No. 15/749,148), with English translation. (12 pages).
Final Office Action dated Jan. 24, 2020, issued in U.S. Appl. No. 15/539,928. (8 pages).
Office Action dated Mar. 2, 2020, issued in EP application No. 15873333.7 (counterpart to U.S. Appl. No. 15/539,927). (4 pages).
Office Action dated Jun. 11, 2019, issued in JP application No. 2015-176205 (counterpart to U.S. Appl. No. 15/539,946), with partial English translation. (5 pages).
Office Action dated Jun. 13, 2019, issued in JP application No. 2015-176204 (counterpart to U.S. Appl. No. 15/539,926), with partial English translation. (5 pages).
Office Action dated Feb. 27, 2019, issued in CN application No. 201580071004.1 (counterpart to U.S. Appl. No. 15/539,927), with partial English translation. (12 pages).
Extended (Supplementary) European Search Report dated Feb. 14, 2019, issued in EP application No. 16832969.6 (counterpart to U.S. Appl. No. 15/749,250)(6 pages).
Office Action dated Feb. 7, 2019, issued in EP application No. 15873333.7(counterpart to U.S. Appl. No. 15/539,927)(4 pages).
Extended (Supplementary) European Search Report dated Mar. 6, 2019, issued in EP application No. 16832970.4 (counterpart to U.S. Appl. No. 15/749,148)(9 pages).
Requirement for Restriction Election dated Feb. 27, 2019, issued in U.S. Appl. No. 15/539,928 (7 pages).
Extended (Supplementary) European Search Report dated Mar. 7, 2019, issued in counterpart EP application No. 16839019.3. (6 pages).
Notice of Allowance dated Mar. 28, 2019, issued in U.S. Appl. No. 15/539,927 (27 pages).
Horiba Scientific, "Particle Size Result Interpretation: Number vs. Volume Distributions", website entry: url: http://www.horiba.com/scientific/products/particle-characterization/education/general-information/data-interpretation/number-vs-volume-distributions/, cited in Notice of Allowance dated Mar. 28, 2019. (4 pages).
Requirement for Restriction Election dated Feb. 8, 2019, issued in U.S. Appl. No. 15/539,946 (5 pages).
Notice of Allowance dated Mar. 20, 2019, issued in U.S. Appl. No. 15/539,926 (28 pages).
Office Action dated Feb. 4, 2020, issued in TW application No. 105124140 (counterpart to U.S. Appl. No. 15/749,250), with partial English translation. (21 pages).
Office Action dated Feb. 4, 2020, issued in counterpart TW application No. 105125188, with partial English translation. (12 pages).
Office Action dated Feb. 5, 2020, issued in TW application No. 105124139 (counterpart to U.S. Appl. No. 15/749,148), with partial English translation. (15 pages).
Office Action dated Mar. 16, 2020, issued in CN application No. 201680037679.9 (counterpart to U.S. Appl. No. 15/749,148), with English translation. (13 pages).
Office Action dated Apr. 19, 2018, issued in U.S. Appl. No. 15/539,926. (10 pages).
Office Action dated May 31, 2019, issued in CN application No. 201680037679.9 (counterpart to U.S. Appl. No. 15/749,148), with English translation. (10 pages).
Office Action dated Aug. 26, 2019, issued in EP application No. 15873333.7 (counterpart to U.S. Appl. No. 15/539,927). (3 pages).
Office Action dated Jul. 22, 2019, issued in TW application No. 104143840 (counterpart to U.S. Appl. No. 15/539,928), with English translation. (13 pages).
Extended (Supplementary) European Search Report dated Sep. 24, 2018, issued in counterpart application No. 1587333.1. (9 pages).
Office Action dated Oct. 31, 2018, issued in Chinese application No. 201580071024.9, with English translation corresponds to U.S. Appl. No. 15/539,928. (11 pages).

(56) References Cited

OTHER PUBLICATIONS

Office Action dated Aug. 21, 2019, issued in TW application No. 104143837 (counterpart to U.S. Appl. No. 15/539,927), with partial English translation. (10 pages).
Office Action dated Nov. 6, 2019, issued in CN application No. 201580071018.3 (counterpart to U.S. Appl. No. 15/539,946), with English translation. (13 pages).
Office Action dated Nov. 6, 2019, issued in CN application No. 201580071036.1 (counterpart to U.S. Appl. No. 15/539,926), with English translation. (13 pages).
Yildirim et al., "Template free preparation of nanoporous organically modified silica thin films on flexible substrates", Journal of Materials Chemistry, 2011, 21, pp. 14830-14837, cited in Specification of PCT/JP2015/086364, PCT/JP2015/086365 and PCT/JP2016/072452. (8 pages).
Adachi et al., "Preparation of the Silica Gel Monolith by the Sol-Gel Method Using N, N-Dimethylformamide and the Vitrification of the Gel", Yogyo-Kyokai-Shi, 1987, 95, pp. 970-975, cited in Specification of PCT/JP2015/086362 and PCT/JP2015/086363. (6 pages).
International Search Report dated Mar. 8, 2016, issued in International Application No. PCT/JP2015/086362 (counterpart of U.S. Appl. No. 15/539,926). (2 pages).
International Search Report dated Mar. 8, 2016, issued in International Application No. PCT/JP2015/086363 (counterpart of U.S. Appl. No. 15/539,946). (2 pages).
International Search Report dated Apr. 12, 2016, issued in International Application No. PCT/JP2015/086364 (counterpart of U.S. Appl. No. 15/539,928). (1 page).
International Search Report dated Mar. 29, 2016, issued in International Application No. PCT/JP2015/086365 (counterpart of U.S. Appl. No. 15/539,927). (2 pages).
International Search Report dated Nov. 8, 2016, issued in International Application No. PCT/JP2016/072417 (counterpart of U.S. Appl. No. 15/749,250). (2 pages).
International Search Report dated Nov. 8, 2016, issued in International Application No. PCT/JP2016/072418 (counterpart of U.S. Appl. No. 15/749,148). (3 pages).
International Search Report dated Nov. 8, 2016, issued in International Application No. PCT/JP2016/072452 (counterpart of U.S. Appl. No. 15/754,406). (2 pages).
International Preliminary Report on Patentability (Form PCT/IB/373) dated Jun. 27, 2017 of International Application No. PCT/JP2015/086365(counterpart of U.S. Appl. No. 15/539,927), with Form PCT/ISA/237. (8 pages).
International Preliminary Report on Patentability (Form PCT/IB/373) dated Jun. 27, 2017 of International Application No. PCT/JP2015/086364(counterpartof U.S. Appl. No. 15/539,928), with Form PCT/ISA/237. (11 pages).
International Preliminary Report on Patentability (Form PCT/IB/373) dated Jun. 27, 2017 of International Application No. PCT/JP2015/086363(counterpart of U.S. Appl. No. 15/539,946), with Form PCT/ISA/237. (10 pages).
International Preliminary Report on Patentability (Form PCT/IB/373) dated Jun. 27, 2017 of International Application No. PCT/JP2015/086362(counterpartof U.S. Appl. No. 15/539,926), with Form PCT/ISA/237. (8pages).
International Preliminary Report on Patentability (Form PCT/IB/373) dated Feb. 6, 2018 of International Application No. PCT/JP2016/072418(counterpartof U.S. Appl. No. 15/749,148), with Form PCT/ISA/237. (19 pages).
International Preliminary Report on Patentability (Form PCT/IB/373) dated Feb. 6, 2018 of International Application No. PCT/JP2016/072417(counterpartof U.S. Appl. No. 15/749,250), with Form PCT/ISA/237. (22 pages).
International Preliminary Report on Patentability (Form PCT/IB/373) dated Feb. 27, 2018 of International Application No. PCT/JP2016/072452(counterpartof U.S. Appl. No. 15/754,406), with Form PCT/ISA/237. (8 pages).

Office Action dated May 18, 2020, issued in CN application No. 201580071024.9 (counterpart to U.S. Appl. No. 16/503,009), with English translation. (27 pages).
Office Action dated Jun. 11, 2020, issued in counterpart CN application No. 201680043414.X, with English translation. (13 pages).
Notice of Allowance dated May 20, 2020, issued in U.S. Appl. No. 16/503,009. (47 pages).
Office Action dated Feb. 2, 2021, issued in CN application No. 201580071024.9. with English translation (11 pages) (counterpart to U.S. Appl. No. 15/539,926).
Non-Final Office Action dated Feb. 3, 2021, issued in U.S. Appl. No. 15/749,148 (86 pages).
Kim, Ho-Cheol et al., "Photopatterned Nanoporous Media", Nano Letters, the American Chemical Society, vol. 4, No. 7, 2004; Cited in Non-Final Office Action dated Feb. 3, 2021.
Final Office Action dated Feb. 24, 2021, issued in U.S. Appl. No. 15/749,250 (25 pages).
Non-Final Office Action dated Aug. 5, 2020, issued in U.S. Appl. No. 15/749,250 (9 pages).
Office Action dated Jul. 31, 2020, issued in CN application No. 201580071036.1 (counterpart to U.S. Appl. No. 16/503,009), with English translation. (17 pages).
Office Action dated Aug. 5, 2020, issued in counterpart CN application No. 201580071018.3 (counterpart to U.S. Appl. No. 15/539,946), with English translation. (18 pages).
Non-Final Office Action dated Sep. 16, 2020, issued in U.S. Appl. No. 15/539,928. (10 pages).
Office Action dated Sep. 29, 2020, issued in counterpart JP application No. 2016-149062, with English translation. (8 pages).
Office Action dated Aug. 13, 2020, issued in TW application No. 105124139 (counterpart to U.S. Appl. No. 15/749,148), with partial English translation. (17 pages).
Office Action dated Jan. 5, 2021, issued in JP Application No. 2019-198274, with English translation (10 pages) (counterpart to U.S. Appl. No. 16/503,009).
Final Office Action dated Oct. 27, 2020, issued in U.S. Appl. No. 15/539,946 (8 pages).
Office Action dated Nov. 2, 2020, issued in KR Application No. 10-2017-7035011, with English translation (15 pages) (counterpart to U.S. Appl. No. 15/749,250).
Extended Search Report dated Nov. 25, 2020, issued in EP Application No. 20189340.1 (6 pages) (counterpart to U.S. Appl. No. 15/749,250).
Office Action dated Nov. 19, 2020, issued in EP Application No. 16 832 970.4 (5 pages) (counterpart to U.S. Appl. No. 15/749,148).
Office Action dated Nov. 24, 2020, issued in KR Application No. 10-2017-7035012, with English translation (12 pages) (counterpart to U.S. Appl. No. 15/749,148).
Office Action dated Dec. 2, 2020, issued in counterpart KR Application No. 10-2017-7034375, with English translation (11 pages).
Office Action dated Aug. 19, 2021, issued in CN application No. 201580071024.9, with English Translation. (counterpart to U.S. Appl. No. 15/539,928)(17 pages).
Non-Final Action dated Sep. 9, 2021 issued in U.S. Appl. No. 15/749,250 (36 pages).
Non-Final Office Action dated Apr. 7, 2021, issued in U.S. Appl. No. 15/539,946 (16 pages).
Office Action dated Sep. 6, 2021, issued in KR application No. 10-2017-7035012 (counterpart to U.S. Appl. No. 15/749,148), with English translation. (3 pages).
Final Office Action dated Oct. 15, 2021, issued in U.S. Appl. No. 15/749,148. (37 pages).
Office Action dated Oct. 18, 2021, issued in KR application No. 10-2017-7034375 (counterpart to U.S. Appl. No. 15/754,406), with English translation. (11 pages).
International Search Report dated Dec. 13, 2016, issued in International Application No. PCT/JP2016/076217 (counterpart to U.S. Appl. No. 15/758,073). (1 page).
Office Action dated May 8, 2019, issued in CN application No. 201680051845.0 (counterpart to U.S. Appl. No. 15/758,073), with partial English translation. (12 pages).

(56) References Cited

OTHER PUBLICATIONS

Office Action dated Nov. 12, 2019, issued in TW application No. 105128742 (counterpart to U.S. Appl. No. 15/758,073), with English translation (16 pages).
Office Action dated Apr. 7, 2020, issued in JP application No. 2016-172343 (counterpart to U.S. Appl. No. 15/758,073), with English translation. (4 pages).
Office Action dated May 25, 2020, issued in KR Application No. 10-2018-7008684 (counterpart to U.S. Appl. No. 15/758,073), with Partial translation. (15 pages).
Office Action dated Oct. 20, 2020, issued in JP Application No. 2016-172343 (counterpart to U.S. Appl. No. 15/758,073), with English Translation. (5 pages).
Office Action dated Mar. 26, 2021, issued in KR Application No. 10-2018-7008684 (counterpart to U.S. Appl. No. 15/758,073), with partial English translation (16 pages).
Office Action dated Apr. 13, 2021, issued in JP Application No. 2016-172343 (counterpart to U.S. Appl. No. 15/758,073), with English Translation. (4 pages).
Non-Final Office Action dated Feb. 5, 2020, issued in U.S. Appl. No. 15/758,073. (15 pages).
Non-Final Office Action dated Sep. 3, 2021, issued in U.S. Appl. No. 15/758,073. (38 pages).
Non-Final Office Action dated May 27, 2021, issued in U.S. Appl. No. 15/539,928. (28 pages).
Office Action dated Jun. 3, 2021, issued in CN application No. 202010325596.8 (counterpart to U.S. Appl. No. 15/539,927), with English translation. (13 pages).
Office Action dated Jun. 30, 2021, issued in CN application No. 201680037716.6, with English Translation. (11 pages—counterpart to U.S. Appl. No. 15/749,250).
Non-Final Office Action dated Apr. 13, 2022, issued in U.S. Appl. No. 15/749,148. (21 pages).
Office Action dated Mar. 17, 2022, issued in counterpart CN application No. 201680043414.X, with partial English translation. (18 pages).
Kunshi Zhang, "Submarine optoelectronic equipment technology", Harbin Engineering University Press, published on Dec. 31, 2012, p. 233, with partial English translation, cited in CN Office Action dated Mar. 17, 2022. (4 pages).
Zhixian Zhang, "Synthetic resin and plastic grade manual", Chemical Industry Press, published on Jan. 31, 2001, the second edition, vol. 2, p. 318, with partial English translation, cited in CN Office Action dated Mar. 17, 2022. (4 pages).
Office Action dated Apr. 6, 2022, issued in CN application No. 202010325596.8 (counterpart to U.S. Appl. No. 15/539,927), with English translation. (8 pages).
Office Action dated May 20, 2022, issued in KR application No. 10-2017-7018505 (counterpart to U.S. Appl. No. 15/539,946), with English translation. (13 pages).
Office Action dated May 30, 2022, issued in KR application No. 10-2017-7018502 (counterpart to U.S. Appl. No. 15/539,926), with English translation. (15 pages).
Office Action dated May 30, 2022, issued in KR application No. 10-2017-7018503 (counterpart to U.S. Appl. No. 15/539,946), with English translation. (17 pages).
Office Action dated Jun. 2, 2022, issued in KR application No. 10-2017-7018507 (counterpart to U.S. Appl. No. 15/539,927), with English translation. (13 pages).
Office Action dated Jan. 5, 2022, issued in counterpart JP application No. 2020-219354, with English translation. (6 pages).
Final Office Action dated Feb. 2, 2022, issued in U.S. Appl. No. 15/539,928. (48 pages).
Final Office Action dated Jan. 21, 2022, issued in U.S. Appl. No. 15/539,946. (28 pages).
Office Action dated Jan. 28, 2022, issued in counterpart EP application No. 16839019.3. (5 pages).
Office Action dated Feb. 8, 2022, issued in EP application No. 15873330.3 (counterpart to U.S. Appl. No. 15/539,926). (7 pages).
Office Action dated Jan. 26, 2022, issued in KR application No. 10-2018-7008684 (counterpart to U.S. Appl. No. 15/758,073), with English translation. (15 pages).
Final Office Action dated Mar. 4, 2022, issued in U.S. Appl. No. 15/758,073. (112 pages).
Office Action dated Jul. 12, 2022, issued in JP application No. 2021-115086 (counterpart to U.S. Appl. No. 15/758,073), with English translation. (5 pages).
Non-Final Office Action dated Aug. 4, 2022, issued in U.S. Appl. No. 15/539,946. (5 pages).
Office Action dated Aug. 26, 2022, issued in KR application No. 10-2018-7008684 (counterpart to U.S. Appl. No. 15/758,073), with English translation (17 pages).
Notice of Allowance dated Aug. 3, 2022, issued in U.S. Appl. No. 15/758,073. (27 pages).

\* cited by examiner

LAMINATED OPTICAL FILM, METHOD OF PRODUCING LAMINATED OPTICAL FILM, OPTICAL ELEMENT, AND IMAGE DISPLAY

TECHNICAL FIELD

The present invention relates to a laminated optical film, a method of producing the laminated optical film, an optical element, and an image display.

BACKGROUND ART

Disposing two substrates at a regular spacing forms an air layer which is a void space between the substrates. The air layer formed between the substrates serves as a low refractive layer that reflects light entirely, for example. Thus, for example, in the case of an optical film, components such as a prism, a polarizing film, and a polarizing plate are disposed at regular spacings to provide air layers each of which serves as a low refractive index layer between the components. Forming air layers in such a manner, however, requires disposing the components at regular spacings, which prevents the components from being stacked sequentially and causes time and trouble in production. Combining optical elements thorough a spacer (frame) or the like for maintaining an air layer increases the thickness of the whole film, which goes against the need for a thin and lightweight film.

For solving such problems, there are attempts of application of a layer with void spaces (hereinafter, also referred to as a "void-provided layer") having a low refractive index as a substitute for an air layer which is a void space between the components (for example, see Non-Patent Document 1).

CITATION LIST

Patent Document(s)

Non-Patent Document 1: J. Mater. Chem., 2011, 21,14830-14837

BRIEF SUMMARY OF THE INVENTION

Problem to be Solved by the Invention

In the development of an element, for achieving a low refractive index, there is a need for designing the element having a high proportion of void space. There, however, is a problem that having a high proportion of void space decreases the bulk density of the element, which significantly decreases the strength and decreases the abrasion resistance. Also in Non-Patent Document 1, there is a problem that the obtained void-provided layer is inferior in strength and abrasion resistance. As described above, there has been no report about the development of a laminated optical film achieving both a high proportion of void space (porosity) and superior abrasion resistance.

Hence, the present invention is intended to provide a laminated optical film that achieves both a high proportion of void space (porosity) and superior abrasion resistance, a method of producing the laminated optical film, an optical element, and an image display.

Means for Solving Problem

In order to achieve the above object, the present invention provides a laminated optical film including: a void-provided layer; a resin film; and a cover layer, wherein the void-provided layer is formed on the resin film, the cover layer is formed directly on the void-provided layer, and the void-provided layer has a contact angle with water of 90° or more and a proportion of void space of 30 vol % or more.

The present invention also provides a method of producing the laminated optical film according to the present invention, including steps of forming the void-provided layer on the resin film; and forming the cover layer directly on the void-provided layer.

The present invention also provides an optical element including the laminated optical film according to the present invention.

The present invention also provides an image display including the optical element according to the present invention.

Effects of the Invention

The laminated optical film of the present invention achieves both a high proportion of void space (porosity) and superior abrasion resistance. According to the production method of a laminated optical film of the present invention, the laminated optical film of the present invention achieving both a high proportion of void space (porosity) and superior abrasion resistance can be produced. The laminated optical film of the present invention may be used for an optical element and an image display of the present invention, for example. The present invention, however, is not limited thereto and can be used for any purpose.

DETAILED DESCRIPTION OF THE INVENTION

Figure 1:
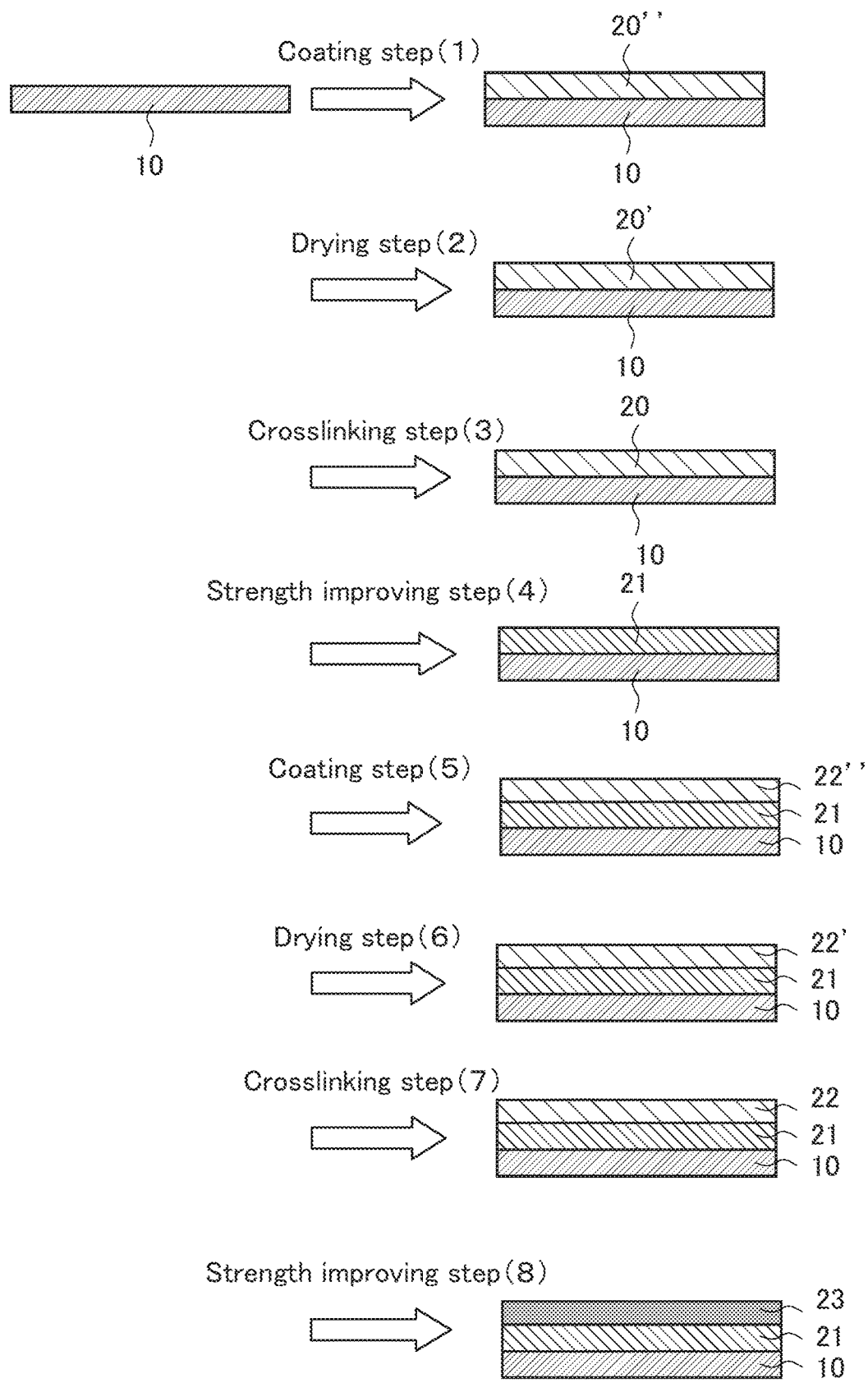
FIG. 1 is a process cross sectional view schematically showing an example of the method of forming a void-provided layer and a cover layer on a resin film in the present invention.

In the laminated optical film of the present invention, for example, the cover layer has a proportion of void space of 10 vol % or less.

In the laminated optical film of the present invention or in the production method of a laminated optical film of the present invention, the cover layer may be, for example, a layer formed by application of a water-based coating material. The cover layer may be, for example, a layer having an abrasion resistance.

In the laminated optical film of the present invention, the cover layer contains, for example, at least one of a water-soluble crosslinked product and a water-soluble polymer.

In the laminated optical film of the present invention or the production method of a laminated optical film of the present invention, for example, the cover layer may be formed by applying a cover layer raw material liquid containing a raw material of the cover layer directly to the void-provided layer or applying the cover layer raw material liquid to another base and transferring it to the void-provided layer. Furthermore, at least one of heating and light irradiation may be conducted after the cover layer has formed on the void-provided layer. The cover layer raw material liquid may be, for example, a liquid containing a compound that decomposes and generates a base by heating or light irradiation. For example, the cover layer raw material liquid may be a liquid containing at least one of monomer and oligomer of water-soluble alkoxysilane or a liquid containing a crosslinked product formed from at least one of monomer and oligomer of water-soluble alkoxysilane.

In the laminated optical film of the present invention, the void-provided layer and the cover layer may contain monomer and/or oligomer of water-soluble alkoxysilane or may contain a crosslinked product formed from monomer and/or oligomer of water-soluble alkoxysilane, for example.

In the laminated optical film of the present invention, the void-provided layer may be, for example, a layer formed from a porous body containing microporous particles and/or a layer formed from a fibrous substance such as nanofiber or the like.

In the laminated optical film of the present invention, for example, the void-provided layer has a refractive index of 1.3 or less.

In the production method of a laminated optical film of the present invention, the cover layer forming step includes a step of applying a cover layer raw material liquid containing a raw material of the cover layer directly to the void-provided layer (cover layer raw material liquid coating step) or a step of applying the cover layer raw material liquid to another base and transferring the thus obtained cover layer to the void-provided layer (transfer step), for example. In the step of applying the cover layer raw material liquid directly to the void-provided layer or the step of applying the cover layer raw material to another base, for example, the cover layer raw material liquid after application may be dried. The drying may be conducted by heating, for example. Then, after the cover layer raw material liquid coating step or the transfer step, for example, the cover layer is formed by at least one of additional heating and light irradiation. The cover layer raw material liquid may contain a compound that decomposes and generates a base by heating or light irradiation, for example. The cover layer may be formed by heating at 80° C. or less for 1 hour or more after the cover layer raw material liquid drying step, for example.

In the production method of a laminated optical film of the present invention, the cover layer raw material liquid is, for example, a liquid containing at least one of monomer and oligomer of water-soluble alkoxysilane.

In the production method of a laminated optical film of the present invention, the void-provided layer is a porous body in which microporous particles are chemically bonded, and the microporous particles are chemically bonded in the void-provided layer forming step, for example. In the present invention, the shape of the "particle" (for example, the microporous particle) is not limited to particular shapes, and can be, for example, a spherical shape or any other shape. Furthermore, in the present invention, the microporous particle may be, for example, a sol-gel beaded particle, a nanoparticle (hollow nanosilica/nanoballoon particle), and the like. In the production method of a laminated optical film of the present invention, the microporous particle is, for example, a silicon compound microporous particle and the porous body is a silicone porous body. The silicon compound microporous particle includes, for example, a pulverized product of a gelled silica compound. Another embodiment of the void-provided layer includes a void-provided layer including a fibrous substance such as nanofiber, wherein the fibrous substance is tangled to form a layer with void spaces. The production method of such a void-provided layer is not particularly limited, and is the same as that of the void-provided layer of the porous body in which the microporous particles are chemically bonded. Besides the aforementioned embodiment, the void-provided layer may be a void-provided layer formed by using hollow nanoparticles and nanoclay or a void-provided layer formed by using hollow nanoballoons and magnesium fluoride. These void-provided layers may be void-provided layers made of a single configuration substance or of multiple configuration substances. The void-provided layer may be the layer adopting one of the aforementioned embodiments or the layer adopting more than one of the aforementioned embodiments. The present invention is described below mainly with reference to the void-provided layer of a porous body in which the microporous particles are chemically bonded.

In the production method of a laminated optical film of the present invention, for example, the porous structure of the porous body has an open-cell structure in which the pore structures are interconnected.

The production method of a laminated optical film of the present invention further includes, for example, steps of preparing a liquid containing the microporous particles (hereinafter, also referred to as a "microporous particle-containing liquid"); coating the resin film with the liquid; and drying the liquid applied on the resin film, wherein the microporous particles are chemically bonded to form the porous body in the void-provided layer forming step, for example. In the void-provided layer forming step, for example, the void-provided layer is formed by chemically bonding the microporous particles by the catalysis of the catalyst. The catalyst is, for example, a basic catalyst and the microporous particle-containing liquid contains, for example, a base generator that generates the basic catalyst by light irradiation or heating. In the void-provided layer forming step, for example, the void-provided layer is formed by chemically bonding the microporous particles by light irradiation. In the void-provided layer forming step, for example, the void-provided layer is formed by chemically bonding the microporous particles by heating.

The present invention is described below in more detail with reference to illustrative examples. The present invention, however, is not limited or restricted by the following description.

As described above, the laminated optical film of the present invention is characterized in that it includes: a void-provided layer; a resin film; and a cover layer, wherein the void-provided layer is formed on the resin film, the cover layer is formed directly on the void-provided layer, and the void-provided layer has a contact angle with water of 90° or more and a proportion of void space of 30 vol % or more.

The laminated optical film of the present invention, as described above, achieves both a high proportion of void space (porosity) and superior abrasion resistance. While the reason (mechanism) for this is unknown, for example, it is presumed as follows. First, by forming the cover layer directly on the void-provided layer, the abrasion resistance of the void-provided layer increases. The void-provided layer has a contact angle with water of 90° or more, which shows very high water repellency. Thus, even when the cover layer is formed directly on the void-provided layer, owing to the water repellent effect of the void-provided layer, the void-provided structure of the void-provided layer can be prevented from being filled with the cover layer forming material. Furthermore, the void-provided layer has a proportion of void space of 30 vol % or more, which is high. It is presumed that the aforementioned properties allow the laminated optical film of the present invention achieving both a high proportion of void space and superior abrasion resistance. This reason (mechanism), however, is an example of presumable reasons (mechanisms), and does not limit the present invention.

Hereinafter, the laminated optical film of the present invention which is not in the form of a roll and the laminated optical film of the present invention which is in the form of a roll ("the laminated optical film roll of the present invention") are also collectively referred to simply as "the laminated optical film of the present invention". That is, hereinafter, "the laminated optical film of the present invention" includes the laminated optical film roll of the present invention, unless otherwise stated. The laminated optical film of the present invention which is not in the form of a roll can be obtained by cutting a part of the laminated optical film roll of the present invention, for example.

[1. Laminated Optical Film]

The laminated optical film of the present invention, for example, includes the void-provided layer, the cover layer, and the resin film, wherein the void-provided layer is formed on the resin film and the cover layer is formed directly on the void-provided layer. It can be said that the laminated optical film is a low refractive material having the above described properties.

[Resin Film]

In the laminated optical film of the present invention, the resin film is not limited to particular resin films, and examples of the resin include thermoplastic resins with superior transparency such as polyethylene terephthalate (PET), acryl, cellulose acetate propionate (CAP), cycloolefin polymer (COP), triacetylcellulose (TAC), polyethylene naphthalate (PEN), polyethylene (PE), polypropylene (PP), and polycarbonate (PC).

The void-provided layer of the laminated optical film of the present invention (hereinafter, also referred to as a "void-provided layer of the present invention") may be formed directly on the resin film or formed indirectly on the resin film through another layer, for example.

[Void-Provided Layer]

Regarding the contact angle with water of the void-provided layer of the present invention, the lower limit is, for example, 90° or more, 95° or more, or 100° or more, the upper limit is, for example, 150° or less, 145° or less, or 140° or less, and the range thereof is, for example, 90° or more and 150° or less, 95° or more and 145° or less, or 100° or more and 140° or less. The contact angle is measured, for example, with "fully automated contact angle meter DM700" which is a product of Kyowa Interface Science Co., Ltd.

Regarding the proportion of void space of the void-provided layer, the lower limit is, for example, 30 vol % or more, 40 vol % or more, 45 vol % or more, or 50 vol % or more, the upper limit is, for example, 80 vol % or less, 70 vol % or less, or 65 vol % or less, and the range thereof is, for example, 30 vol % or more and 80 vol % or less, 40 vol % or more and 80 vol % or less, 45 vol % or more and 70 vol % or less, or 50 vol % or more and 65 vol % or less. The proportion of void space can be measured by the method described below based on the film density of the void-provided layer.

(Evaluation of Film Density and Porosity)

After forming a void-provided layer (the void-provided layer of the present invention) on a base (acrylic film), the X-ray reflectivity in a total reflection region of the void-provided layer of this laminate is measured using an X-ray diffractometer (product of RIGAKU, product name: RINT-2000). Then, after fitting with Intensity at 2θ, the film density (g/cm$^3$) is calculated from the total reflection angle of the laminate (void-provided layer and base), and the porosity (P %) is calculated according to the following formula.

$$\text{porosity}(P\ \%)=45.48\times\text{film density}(g/cm^3)+100(\%)$$

The void-provided layer of the present invention has, for example, a pore structure. The size of a void space (pore) in the present invention indicates not the diameter of the short axis but the diameter of the long axis of the void space. The preferable size of a void space (pore) is, for example, in the range from 2 nm to 500 nm. The lower limit of the size of a void space is, for example, 2 nm or more, 5 nm or more, 10 nm or more, or 20 nm or more, the upper limit of the size of a void space is, for example, 500 nm or less, 200 nm or less, or 100 nm or less, and the size of a void space is, for example, in the range from 2 nm to 500 nm, 5 nm to 500 nm, 10 nm to 200 nm, or 20 nm to 100 nm. A preferable size of a void space changes depending on applications of the void-provided structure. Thus, the size of a void space should be adjusted to a desired size according to purposes, for example. The size of a void space can be evaluated by the method described below.

(Evaluation of Size of Void Space)

In the present invention, the size of a void space can be quantified according to the BET test. Specifically, 0.1 g of a sample (the void-provided layer of the present invention) is set in the capillary of a surface area measurement apparatus (product of Micromeritics, product name: ASAP 2020) and dried under a reduced pressure at room temperature for 24 hours to remove gas in the void-provided structure. Then, an adsorption isotherm is created by adsorbing a nitrogen gas to the sample, thereby obtaining a pore distribution. The size of a void space can thereby be evaluated.

In the void-provided layer of the present invention, the haze showing transparency is not particularly limited, and the upper limit thereof is, for example, less than 5% or less than 3%, the lower limit thereof is, for example, 0.1% or more or 0.2% or more, and the haze is, for example, 0.1% or more and less than 5% or 0.2% or more and less than 3%.

The haze can be measured, for example, by the method described below.

(Evaluation of Haze)

Avoid-provided layer (the void-provided layer of the present invention) is cut into a piece having a size of 50 mm×50 mm, and the obtained piece is set to a hazemeter (product of Murakami Color Research Laboratory, product name: HM-150) to measure a haze. The haze value is calculated according to the following formula.

$$\text{haze }(\%)=[\text{diffuse transmittance }(\%)/\text{total light transmittance }(\%)]\times100(\%)$$

Commonly, a ratio between the transmission speed of the wavefront of light in vacuum and the phase velocity of light in a medium is called a refractive index of the medium. The upper limit of the refractive index of the void-provided layer of the present invention is, for example, 1.3 or less, 1.25 or less, 1.20 or less, or 1.15 or less, the lower limit thereof is, for example, 1.05 or more, 1.06 or more, or 1.07 or more, and the refractive index is, for example, in the range from 1.05 to 1.3, 1.06 to 1.25, or 1.07 to 1.20.

In the present invention, the refractive index is a refractive index measured at the wavelength of 550 nm, unless otherwise stated. The method of measuring a refractive index is not limited to particular methods, and the refractive index can be measured, for example, by the method described below.

(Evaluation of Refractive Index)

After forming a void-provided layer (the void-provided layer of the present invention) on an acrylic film, the obtained laminate is cut into a piece having a size of 50 mm×50 mm, and the obtained piece is adhered on the front surface of a glass plate (thickness: 3 mm) with a cover layer. The center of the back surface of the glass plate (diameter: about 20 mm) is solidly painted with a black magic marker, thereby preparing a sample which allows no reflection at the back surface of the glass plate. The sample is set to an ellipsometer (product of J. A. Woollam Japan, product name: VASE), the refractive index is measured at the wavelength of 500 nm and at the incidence angle of 50° to 80°, and the average value is assumed as a refractive index.

The thickness of the void-provided layer of the present invention is not particularly limited, and the lower limit thereof is, for example, 0.01 μm or more, 0.05 μm or more, 0.1 μm or more, or 0.3 μm or more, the upper limit thereof is, for example, 1000 μm or less, 100 μm or less, 80 μm or less, 50 μm or less, or 10 μm or less, and the thickness is, for example, in the range from 0.01 μm to 100 μm.

In the laminated optical film of the present invention, the void-provided layer may include a part where one kind or two or more kinds of structural units that form a structure with minute void spaces are chemically bonded directly or indirectly, for example. For example, in the void-provided layer, there may be a part where the structural units are in contact with each other but not chemically bonded, for example. Note that, in the present invention, "the structural units are "indirectly bonded"" means that the structural units are bonded through binder components each of which is smaller in amount than the amount of the structural unit. On the other hand, "the structural units are "directly bonded" means that the structural units are bonded one another directly without involving binder components and the like. The bond among the structural units may be a bond through catalysis, for example. The bond among the structural units may include a hydrogen bond or a covalent bond, for example. The structural units may be in the shape of at least one of a particle, fiber, and a plate, for example. Each of the structural unit in the shape of a particle and the structural unit in the shape of a plate may be made of an inorganic matter, for example. The configuration element of the structural unit in the shape of a particle may include at least one element selected from the group consisting of Si, Mg, Al, Ti, Zn, and Zr, for example. The structure (structural unit) in the shape of a particle may be a solid particle or a hollow particle, and specific examples thereof include silicon particles, silicon particles with micropores, silica hollow nanoparticles, and silica hollow nanoballoons. The structural unit in the shape of fiber can be, for example, nanofiber having a nano-sized diameter, and specific examples thereof include cellulose nanofiber and alumina nanofiber. The structural unit in the shape of a plate can be, for example, nanoclay. Specifically, the structural unit in the shape of a plate can be, for example, nano-sized bentonite (for example, Kunipia F [product name]). The structural unit in the shape of fiber may be at least one selected from the group consisting of carbon nanofiber, cellulose nanofiber, alumina nanofiber, chitin nanofiber, chitosan nanofiber, polymer nanofiber, glass nanofiber, and silica nanofiber, for example, although it is not particularly limited. The structural unit may be, for example, a microporous particle. For example, the void-provided layer may be a porous body in which microporous particles are chemically bonded, and the microporous particles may be chemically bonded directly or indirectly in the void-provided layer forming step, for example. In this state, as described, "the microporous particles are "indirectly bonded"" means that the microporous particles may be bonded through binder components each of which is smaller in amount than the amount of the microporous particle, for example. In the present invention, the shape of the "particle" (for example, the microporous particle) is not limited to particular shapes, and can be, for example, a spherical shape or any other shape. Furthermore, in the present invention, the microporous particle may be, for example, a sol-gel beaded particle, a nanoparticle (hollow nanosilica/nanoballoon particle), nanofiber, and the like as described above. In the production method of a laminated film of the present invention, the microporous particle is, for example, a silicon compound microporous particle and the porous body is a silicone porous body. The silicon compound microporous particle includes, for example, a pulverized product of a gelled silica compound. Another embodiment of the void-provided layer includes a void-provided layer including a fibrous substance such as nanofiber, wherein the fibrous substance got tangled to form a layer with void spaces. The production method of such a void-provided layer is not particularly limited, and is the same as that of the void-provided layer of the porous body in which the microporous particles are chemically bonded. Besides the aforementioned embodiment, as described above, the void-provided layer may be a void-provided layer formed by using hollow nanoparticles and nanoclay or a void-provided layer made by using hollow nanoballoons and magnesium fluoride. These void-provided layers may be void-provided layers made of a single configuration substance or of multiple configuration substances. The void-provided layer may be the layer adopting one of the aforementioned embodiments or the layer adopting more than one of the aforementioned embodiments.

The void-provided layer of the present invention is, for example, a layer formed from a porous body containing microporous particles. The microporous particle can be, for example, a pulverized product of a gelled compound. In the porous body, for example, the pulverized products are chemically bonded. In the void-provided layer of the present invention, the pattern of the chemical bond among the pulverized products is not limited to particular patterns. Specifically, the chemical bond can be, for example, a crosslinking bond. The method of chemically bonding the pulverized products is described in detail in the description as to the production method of the present invention.

The gel form of the gelled compound is not limited to particular forms. The "gel" commonly denotes a solidified state of solutes aggregated as they lost independent motility due to interaction. Commonly, a wet gel is a gel containing a dispersion medium in which solutes build a uniform structure, and a xerogel is a gel from which a solvent is removed and in which solutes form a network structure with void spaces. In the present invention, the gelled compound can be a wet gel or a xerogel, for example.

The gelled compound can be, for example, a gelled product obtained by gelating monomer compounds. The gel compound may be, for example, a gelled silicon compound. Specifically, the gelled silicon compound can be, for example, a gelled product in which the monomer silicon compounds are bonded. As a specific example, the gelled silicon compound can be a gelled product in which the monomer silicon compounds are bonded by a hydrogen bond or an intermolecular bond. The bond can be, for example, a bond by dehydration condensation. The method of gelation is described below in the description as to the production method of the present invention.

In the void-provided layer of the present invention, the volume average particle size showing particle size variations of the microporous particle is not particularly limited, and the lower limit thereof is, for example, 0.10 μm or more, 0.20 μm or more, or 0.40 μm or more, the upper limit thereof is, for example, 2.00 μm or less, 1.50 μm or less, or 1.00 μm or less, and the volume average particle size is, for example, in the range from 0.10 μm to 2.00 μm, 0.20 μm to 1.50 μm, or 0.40 μm to 1.00 μm. The volume average particle size can be measured, for example, using a particle size distribution analyzer based on dynamic light scattering, laser diffraction, or the like or using an electron microscope such as a scanning electron microscope (SEM) or a transmission electron microscope (TEM).

The particle size distribution showing particle size variations of the microporous particle is not particularly limited. The distribution of the particle having a particle size of 0.4 μm to 1 μm is in the range from 50 wt % to 99.9 wt %, 80 wt % to 99.8 wt %, or 90 wt % to 99.7 wt % or the distribution of the particle having a particle size of 1 μm to 2 μm is in the range from 0.1 wt % to 50 wt %, 0.2 wt % to 20 wt %, or 0.3 wt % to 10 wt %, for example. The particle size distribution can be measured, for example, using a particle size distribution analyzer or an electron microscope.

In the void-provided layer of the present invention, the type of the gelled compound is not limited to particular types. The gelled compound can be, for example, a gelled silicon compound. The present invention is described below with reference to an example in which the gelled compound is a gelled silicon compound. The present invention, however, is not limited thereto.

The crosslinking bond is, for example, a siloxane bond. Examples of the siloxane bond include T2 bond, T3 bond, and T4 bond shown below. In the case where the void-provided layer of the present invention has the siloxane bond, the void-provided layer of the present invention may have one of, two of, or all of the above-mentioned three bond patterns, for example. The void-provided layer having higher proportions of T2 and T3 is superior in flexibility and can be expected to have an original property of a gel but is inferior in film strength. On the other hand, the void-provided layer having a higher proportion of T4 is superior in film strength but has small sized void spaces and is inferior in flexibility. Thus, it is preferable to change the proportions of T2, T3, and T4 depending on applications, for example.

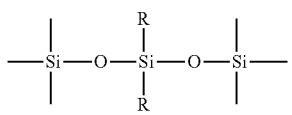

T2

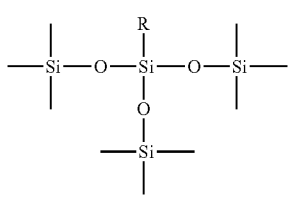

T3

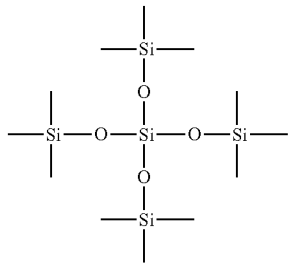

T4

In the case where the void-provided layer of the present invention has the siloxane bond, the relative ratio among T2, T3, and T4 with T2 being considered as "1" is, for example, as follows:
T2:T3:T4=1:[1 to 100]: [0 to 50], 1:[1 to 80]:[1 to 40], or 1:[5 to 60]:[1 to 30].

The silicon atoms contained in the void-provided layer of the present invention are preferably bonded by a siloxane bond, for example. As a specific example, the proportion of the unbonded silicon atoms (i.e., residual silanol) among all the silicon atoms contained in the void-provided layer is, for example, less than 50%, 30% or less, or 15% or less.

When the gelled compound is the gelled silicon compound, the monomer silicon compound is not limited to particular compounds. The monomer silicon compound can be, for example, a compound represented by the following chemical formula (1). When the gelled silicon compound is a gelled product in which monomer silicon compounds are bonded by a hydrogen bond or an intermolecular bond as described above, monomers in the chemical formula (1) can be bonded by a hydrogen bond through their hydroxyl groups, for example.

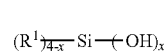

(1)

In the chemical formula (1), for example, X is 2, 3, or 4, and $R^1$ represents a linear or a branched alkyl group. The carbon number of $R^1$ is, for example, 1 to 6, 1 to 4, or 1 to 2. Examples of the linear alkyl group include a methyl group, an ethyl group, a propyl group, a butyl group, a pentyl group, and a hexyl group, and examples of the branched alkyl group include an isopropyl group and an isobutyl group. The X is, for example, 3 or 4.

A specific example of the silicon compound represented by the chemical formula (1) can be a compound represented by the chemical formula (1'), wherein X is 3. In the chemical formula (1'), $R^1$ is the same as that in the chemical formula (1), and is, for example, a methyl group. When $R^1$ represents a methyl group, the silicon compound is tris(hydroxy) methylsilane. When X is 3, the silicon compound is, for example, trifunctional silane having three functional groups.

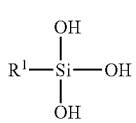

(1')

A specific example of the silicon compound represented by the chemical formula (1) can be a compound represented by the chemical formula (1') wherein X is 4. In this case, the silicon compound is, for example, tetrafunctional silane having four functional groups.

The monomer silicon compound may be, for example, a hydrolysate of a silicon compound precursor. The silicon compound precursor is not limited as long as it can generate the silicon compound by hydrolysis, for example. A specific example of the silicon compound precursor can be a compound represented by the following chemical formula (2).

(2)

In the chemical formula (2), for example, X is 2, 3, or 4, $R^1$ and $R^2$ each represent a linear or branched alkyl group, $R^1$ and $R^2$ may be the same or different, $R^1$s may be the same or different in the case where X is 2, and $R^2$s may be the same or different.

X and $R^1$ are the same as those in the chemical formula (1), for example. Regarding $R^2$, for example, reference can be made to the examples of $R^1$ in the chemical formula (1).

A specific example of the silicon compound precursor represented by the chemical formula (2) can be a compound represented by the chemical formula (2') wherein X is 3. In the chemical formula (2'), $R^1$ and $R^2$ are the same as those in the chemical formula (2). When $R^1$ and $R^2$ both represent methyl groups, the silicon compound precursor is trimethoxy(methyl)silane (hereinafter, also referred to as "MTMS").

(2')

The monomer silicon compound is preferably the trifunctional silane because it is superior in the lowness of refractive index. Also, the monomer silicon compound is preferably the tetrafunctional silane because it is superior in strength (for example, abrasion resistance). Regarding the monomer silicon compounds which are raw materials of the gelled silicon compound, one of the compounds may be used alone or two or more of them may be used in combination, for example. As a specific example, the monomer silicon compound may include only the trifunctional silane, only the tetrafunctional silane, or both of the trifunctional silane and the tetrafunctional silane, and may further include other silicon compounds, for example. When two or more kinds of silicon compounds are used as the monomer silicon compound, the ratio between the compounds is not particularly limited and can be determined appropriately.

The void-provided layer may contain a catalyst for chemically bonding one kind or two or more kinds of structural units that form a structure with minute void spaces, for example. The content of the catalyst is not particularly limited, and the content of the catalyst relative to the weight of the structural unit is, for example, 0.01 wt % to 20 wt %, 0.05 wt % to 10 wt %, or 0.1 wt % to 5 wt %.

The void-provided layer may further contain a crosslinking assisting agent for indirectly bonding one kind or two or more kinds of structural units that form a structure with minute void spaces, for example. The content of the crosslinking assisting agent is not particularly limited, and the content of the crosslinking assisting agent relative to the weight of the structural unit is, for example, 0.01 wt % to 20 wt %, 0.05 wt % to 15 wt %, or 0.1 wt % to 10 wt %.

[Cover Layer]

In the present invention, the cover layer is not particularly limited. In the present invention, the "cover layer" is, for example, a layer (coat layer) that coats the void-provided layer, and is, for example, a layer (overcoat layer) having an abrasion resistance.

In the present invention, the cover layer is formed directly on the void-provided layer. Note that "formed directly on" includes, as described below, both the case of applying the cover layer to the void-provided layer and the case of forming the void-provided layer and the cover layer separately and then transferring the cover layer to the void-provided layer.

Since the void-provided layer has a low solvent resistance, from the viewpoint of suppressing the effect on the solvent resistance, the cover layer can be, for example, a cover layer composition liquid in which water or a hydrocarbon solvent such as hexane is used as a solvent. The void-provided layer is, for example, a cover layer composition liquid in which water is used as a solvent. Regarding the composition in the composition liquid, for example, reference can be made to the examples of the composition (forming material) of the void-provided layer.

The cover layer is, for example, a layer formed by application of a water-based coating material. Thus, the cover layer is water-soluble. Owing to high water repellency of the void-provided layer, the structure of the void-provided layer can be prevented from being filled with the cover layer forming material. The water-based coating material is, for example, a coating liquid in which water is a solvent. The coating liquid in which water is a solvent can be in the form of a solution or a dispersion liquid. A specific forming material of the water-based coating material is not particularly limited, and reference can be made to the examples of the forming material of the void-provided layer, for example.

Preferably, the cover layer contains at least one of a water-soluble crosslinked product and a water-soluble polymer. Since the void-provided layer is high in water repellency, if a water-based coating material which is a raw material of a cover layer is consisting of monomer and/or oligomer and is low in viscosity, there is a possibility of causing cissing in coating, which results in failure of forming a cover layer on the void-provided layer. On the other hand, owing to a water-soluble crosslinked product and/or a water-soluble polymer contained in the cover layer, it is possible to increase the viscosity of the water-based coating material to prevent cissing. The water-soluble crosslinked product and the water-soluble polymer are not particularly limited, and reference can be made to the water-soluble crosslinked products and water-soluble polymers described as examples of the forming material of the void-provided layer, for example. The water-soluble crosslinked product can be, for example, a crosslinked product (hereinafter, also referred to as the "water-soluble silane crosslinked product") formed from at least one of monomer and oligomer of water-soluble alkoxysilane which is an organic-inorganic hybrid. The water-soluble silane crosslinked product is not particularly limited, and can be, for example, a silica compound which is crosslinked by the siloxane bond, and examples thereof include silica compounds having the T2 bond, T3 bond, and T4 bond, respectively.

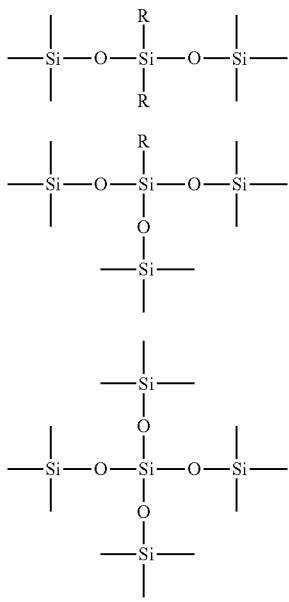

Examples of the water-soluble polymer include acrylic polymers, vinyl alcohol polymers, silicone polymers, polyester polymers, polyurethane polymers, and polyether polymers. The water-soluble polymer is, for example, a silicone polymer, and the silicone polymer can be, for example, an alkoxysilane polymer represented by the chemical formula (2). In particular, polyvinyl alcohol polymers, polyurethane polymers, self-crosslinking type acrylic emulsion, and the like are preferable in view of the stability and ability of increasing the viscosity of a polymer aqueous solution.

$$(R^1)_{4-x}\text{—Si}\text{—}(OR^2)_x \quad (2)$$

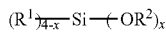

Owing to at least one of the water-soluble crosslinked product and the water-soluble polymer contained in the cover layer, for example, a hydrogen bond can be formed with structural units of the void-provided layer, thereby improving the adhesion between the void-provided layer and the cover layer. Furthermore, owing to silane monomer and/or silane oligomer contained in the cover layer, the cover layer is compatible with the void-provided layer, thereby improving the adhesion between the void-provided layer and the cover layer.

As to the water-soluble crosslinked products and the water-soluble polymers, one of them may be used alone or two or more of them may be used in combination, (for example, mixture, laminate, and the like).

The cover layer is, for example, a layer formed by applying a cover layer raw material liquid to the void-provided layer, drying the applied cover layer raw material liquid, and conducting at least one of heating and light irradiation. The cover layer raw material liquid is, for example, a liquid further containing a compound that decomposes and generates a base by heating or light irradiation (hereinafter, simply referred to as a "base generation compound") or a liquid containing at least one of monomer and oligomer of water-soluble alkoxysilane which is an organic-inorganic hybrid. The cover layer raw material liquid may be a liquid containing both the base generation compound and at least one of monomer and oligomer of water-soluble alkoxysilane.

The base generation compound is not particularly limited, and reference can be made to the examples of the base generation compound described as the forming material of the void-provided layer. Specifically, for example, the base generation compound can be a substance (thermal base generator) that generates a basic catalyst by heating, a substance (photobase generator) that generates a basic catalyst by light irradiation, and the like. The base generation compound is, for example, a photobase generator. The thermal base generator can be, for example, urea. Examples of the photobase generator include 9-anthrylmethyl N,N-diethylcarbamate (product name: WPBG-018), (E)-1-[3-(2-hydroxyphenyl)-2-propenoyl]piperidine (product name: WPBG-027), 1-(anthraquinon-2-yl)ethyl imidazolecarboxylate (product name: WPBG-140), 2-nitrophenylmethyl 4-methacryloyloxypiperidine-1-carboxylate (product name: WPBG-165), 1,2-diisopropyl-3-[bis(dimethylamino) methylene]guanidium 2-(3-benzoylphenyl)propionate (product name: WPBG-266), 1,2-dicyclohexyl-4,4,5,5-tetramethyl-biguanidium n-butyltriphenylborate (product name: WPBG-300), 2-(9-oxoxanthen-2-yl)propionic acid 1,5,7-triazabicyclo[4.4.0]dec-5-ene (Tokyo Kasei Kogyo Co., Ltd.), and a compound containing 4-piperidinemethanol (product of Heraeus, product name: HDPD-PB100). Note here that each product with the name including "WPBG" is a product of Wako Pure Chemical Industries, Ltd.

The monomer of the water-soluble alkoxysilane is not particularly limited, and reference can be made to the examples of monomer described as the forming material of the void-provided layer. Specifically, the monomer of the water-soluble alkoxysilane can be, for example, a silicon compound represented by the chemical formula (2), and the oligomer of the water-soluble alkoxysilane can be, for example, oligomer of a silicon compound represented by the chemical formula (2).

$$(R^1)_{4-x}\text{—Si}\text{—}(OR^2)_x \quad (2)$$

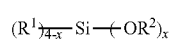

Owing to the base generation compound contained in the cover layer, for example, by the catalysis using the photobase generator, the chemical bond (for example, crosslinking reaction) between the compounds (for example, monomer and/or oligomer of water-soluble alkoxysilane, etc.) in the cover layer and the microporous particles of the void-provided layer is promoted and the adhesion between the cover layer and the void-provided layer is further increased, for example.

The formation of the void-provided layer and the cover layer may be, for example, as described below, as follows: the formed void-provided layer is subjected to a strength improving step (void-provided layer strength improving step), then a cover layer is formed, and the formed cover layer is subjected to a strength improving step (cover layer strength improving step). In this manner, the void-provided layer strength improving step and the cover layer strength improving step may be performed separately. For example, the cover layer may be formed prior to the void-provided layer strength improving step, and the cover layer strength improving step and the void-provided layer strength improving step may be performed at the same time. In other words, the cover layer strength improving step and the void-provided layer strength improving step may be performed separately or at the same time. Performing the strength improving step (aging step) of the void-provided layer and the strength improving step (aging step) of the cover layer at the same time allows gelation of the compounds in the cover layer and the microporous particles in the void-provided layer at the same time, for example, thereby improving the adhesion between the cover layer and the void-provided layer as well as improving the abrasion resistance of the cover layer.

The thickness of the cover layer is not particularly limited, and is, for example, in the range from 50 nm to 10000 nm, 100 nm to 5000 nm, 150 nm to 4000 nm, or 200 nm to 3000 nm.

The proportion of void space of the cover layer is not particularly limited, and is, for example, 10 vol % or less, is preferably 9 vol % or less or 8 vol % or less in the viewpoint of improving the abrasion resistance, for example. The proportion of void space can be measured by the aforementioned method based on the film density of the void-provided layer.

The laminated optical film of the present invention is, for example, in the form of a roll. For example, the laminated optical film of the present invention may further include a resin film, and the void-provided layer may be formed on the long resin film as described above. In this case, another long film may be formed on the laminated optical film of the present invention. Specifically, another long resin film (for example, interleaving paper, release film, surface protection film, or the like) may be formed on the laminated optical film of the present invention including the resin film and the void-provided layer, and then the obtained laminate may be wound in the form of a roll.

The method of producing a laminated optical film of the present invention is not limited to particular methods, and the laminated film of the present invention can be produced, for example, by the production method of the present invention described below.

[2. Outline and Details of Production Method of Laminated Optical Film]

The production method of a laminated optical film of the present invention, as described above, is characterized in that it includes steps of forming the void-provided layer on the resin film and forming the cover layer directly on the void-provided layer. Regarding the production method of the present invention, reference can be made to the description as to the laminated optical film of the present invention, unless otherwise noted.

[2.1 Outline of Void-Provided Layer Forming Step]

In the production method of a laminated optical film of the present invention, the void-provided layer is, for example, a porous body in which microporous particles are chemically bonded, and the microporous particles are chemically bonded in the void-provided layer forming step, for example. The production method of a laminated optical film of the present invention may further include, as described above, steps of preparing a microporous particle-containing liquid; coating the resin film with the liquid; and drying the liquid applied on the resin film, wherein the microporous particles may be chemically bonded to form the porous body in the void-provided layer forming step, for example. In the void-provided layer forming step, the void-provided layer may be formed by chemically bonding the microporous particles by the catalysis of the catalyst. In this case, the catalyst is a basic catalyst and the microporous particle-containing liquid contains, for example, a base generator that generates the basic catalyst by light irradiation or heating. Furthermore, the void-provided layer forming step may include a step of forming the void-provided layer by chemically bonding the microporous particles by light irradiation or heating (chemical treatment step) and a step of improving the strength of the void-provided layer by heating or the like (strength improving step (aging step)). As another embodiment of the void-provided layer, there is a void-provided layer consisting of a fibrous substance such as nanofiber or the like in which the fibrous substance got tangled to form void spaces. The production method of such a void-provided layer is the same as that of the void-provided layer containing the microporous particles. Besides this, the void-provided layer of the present invention includes a void-provided layer formed using hollow nanoparticles and nanoclay and a void-provided layer formed using hollow nanoballoons and magnesium fluoride.

The liquid containing the microporous particles (also referred to as the "microporous particle-containing liquid" or the "liquid") is not particularly limited, and can be, for example, a suspension containing the microporous particles. The present invention is described below mainly with reference to an example in which the microporous particle is a pulverized product of a gelled compound and the void-provided layer is a porous body (preferably, silicone porous body) including pulverized products of a gelled compound. The present invention, however, can be performed in the same manner also in the case where the microporous particle is something other than the pulverized product of a gelled compound.

The production method of the present invention forms a void-provided layer which is superior in the lowness of refractive index, for example. The following theory about the reason for this can be formed. The present invention, however, is not limited thereto.

Since the microporous particle used in the production method of the present invention is obtained by pulverizing the gelled silicon compound, for example, the three-dimensional structure of the gelled silicon compound before pulverization is dispersed into three-dimensional basic structures. In the production method of the present invention, the precursor having a porous structure based on the three-dimensional basic structures is formed by coating the base with the pulverized products of a gelled silicon compound. That is, according to the production method of the present invention, a new porous structure is formed of the pulverized products each having the three-dimensional basic structure, which is different from the three-dimensional structure of the gelled silicon compound. Thus, the finally obtained void-provided layer brings about an effect of a low refractive index equivalent to an air layer, for example. Moreover, in the production method of the present invention, for example, since the microporous particles are chemically bonded, the new three-dimensional structure is immobilized. Thus, the finally obtained void-provided layer, despite its structure with void spaces, can maintain a sufficient strength and sufficient flexibility. The void-provided layer obtained by the production method of the present invention is useful as a substitute for the air layer, in an aspect of low refractive index as well as in strength and flexibility, for example. In the case of an air layer, the air layer is formed between the components by stacking components with a space by providing a spacer or the like therebetween. The void-provided layer obtained by the production method of the present invention can achieve a low refractive index equivalent to the air layer simply by disposing it at a desired site, for example. Thus, as described above, the present invention can impart a low refractive index equivalent to the air layer to an optical element easier and simpler than forming the air layer.

It is only required that the void-provided layer produced by the production method of the present invention has a pore structure (porous structure) as described above, for example, and the void-provided layer may have an open-cell structure in which the pore structures are interconnected, for example. The open-cell structure means, for example, that the pore structures are three-dimensionally interconnected in the silicon porous body, i.e., void spaces in the pore structures are interconnected. When a porous body has an open-cell structure, the porosity of the bulk body can be increased. However, an open-cell structure cannot be formed with closed-cell particles such as hollow silica. In this regard, for example, when the silica sol particle (pulverized product of a gelled silicon compound which forms sol) is used, since the particles have a three-dimensional dendritic structure, the void-provided layer of the present invention can form an open-cell structure easily by settlement and deposition of the dendritic particles in a coating film (sol coating film containing the pulverized products of a gelled silicon compound). The void-provided layer of the present invention preferably forms a monolith structure in which the open-cell structure has multiple pore distributions. The monolith structure denotes a hierarchical structure including a structure in which nano-sized void spaces are present and an open-cell structure in which the nano-sized spaces are aggregated, for example. The monolith structure can impart a film strength with minute void spaces while imparting a high porosity with coarse open-cell structure, which achieve both a film strength and a high porosity, for example. For forming such a monolith structure, for example, it is preferable to control the pore distribution of a void-provided structure to be created in a gel (gelled silicon compound) before pulverizing into the silica sol particles. For example, by controlling the particle size distribution of silica sol particles after pulverization to a desired size in pulverization of the gelled silicon compound, the monolith structure can be formed.

In the void-provided layer forming step, for example, the void-provided layer is formed by chemically bonding the microporous particles by the catalysis using a photobase generator. Furthermore, for example, since a base catalyst generated from the photobase generator remains in the precursor, the chemical bond (for example, crosslinking reaction) of the microporous particles is further promoted by heating or the like in the cover layer forming step. It is considered that this improves the strength of the void-provided layer. As a specific example, when the microporous particle is a silicon compound microporous particle (for example, pulverized products of a gelled silica compound) and residual silanol groups (OH groups) are present in the void-provided layer, the residual silanol groups are chemically bonded by the crosslinking reaction. The description, however, is an illustrative example and does not limit the present invention.

[2.2 Outline of Cover Layer Forming Step]

In the production method of the present invention, the cover layer forming step includes steps of; applying a cover layer raw material liquid containing a raw material of the cover layer directly to the void-provided layer (cover layer raw material liquid coating step); and drying the applied cover layer raw material-containing liquid (cover layer raw material liquid drying step), for example. The cover layer forming step may further include steps of; conducting at least one of heating and light irradiation (chemical treatment step) after the cover layer raw material liquid drying step; and conducting heating at 80° C. or less for 1 hour or more (strength improving step) after the cover layer raw material liquid drying step.

The cover layer raw material liquid (hereinafter, also simply referred to as a "raw material liquid") is not particularly limited, and is, for example, a liquid containing a compound that decomposes and generates a base by heating or light irradiation (hereinafter, also simply referred to as a "base generation compound") or a liquid containing at least one of monomer and oligomer of water-soluble alkoxysilane. The cover layer raw material liquid may contain both the base generation compound and at least one of monomer and oligomer of water-soluble alkoxysilane. Regarding the base generation compound, reference can be made to examples of the base generation compound described in the description as to the cover layer of the laminated optical film of the present invention. Regarding the monomer and oligomer of the water-soluble alkoxysilane, reference can be made to examples of the monomer and oligomer of the water-soluble alkoxysilane described in the description as to the cover layer of the laminated optical film of the present invention.

Regarding the production method of the present invention, reference can be made to the description as to the laminated optical film of the present invention, unless otherwise noted.

In the production method of the present invention, regarding the microporous particle, the monomer compound, and the precursor of the monomer compound, reference can be made to the description as to the void-provided layer of the present invention.

[2.3 Details of Production Method of Laminated Optical Film]

The production method of a laminated optical film of the present invention can be performed, for example, as described below. The present invention, however, is not limited thereto.

[2.3.1 Details of Void-Provided Layer Forming Step]

First, the void-provided layer forming step of the present invention is described below. For example, a void-provided layer formed from a porous body containing silica particles is described. The method of forming a void-provided layer, however, is not limited thereto.

[2.3.1.1 Microporous Particle-Containing Liquid Preparing Step]

The production method of a laminated optical film of the present invention, for example, includes a step of preparing the microporous particle-containing liquid as described above. When the microporous particle is a microporous particle of a silicon compound, it includes a pulverized product of a gelled silica compound. The pulverized product can be obtained, for example, by pulverizing the gelled silicon compound. By pulverization of the gelled silica compound, as described above, the three-dimensional structure of the gelled compound is destroyed and dispersed into three-dimensional basic structures.

Generation of the gelled silica compound by gelation of the silicon compound and preparation of the pulverized product by pulverization of the gelled silica compound are described below with reference to examples. The present invention, however, is not limited thereto.

The gelation of the silicon compound can be performed, for example, by bonding the silicon compounds by a hydrogen bond or an intermolecular bond.

The silicon compound can be, for example, a silicon compound represented by the chemical formula (1) described in the description as to the void-provided layer of the present invention.

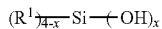  (1)

Since the silicon compound represented by the chemical formula (1) has a hydroxyl group, monomers in the chemical formula (1) can be bonded by a hydrogen bond or an intermolecular bond through their hydroxyl groups, for example.

The silicon compound may be the hydrolysate of the silicon compound precursor as described above, and may be generated by hydrolyzing the silicon compound precursor represented by the chemical formula (2) described in the description as to the void-provided layer of the present invention, for example.

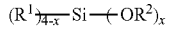  (2)

The method of hydrolyzing the silicon compound precursor is not limited to particular methods, and can be performed by a chemical reaction in the presence of a catalyst, for example. Examples of the catalyst include acids such as an oxalic acid and an acetic acid. The hydrolysis reaction can be performed, for example, by gradually dropping an oxalic acid aqueous solution to a mixture (for example, suspension) of the silicon compound and dimethylsulfoxide to mix at room temperature, and stirring the resultant for about 30 minutes. In hydrolysis of the silicon compound precursor, for example, by completely hydrolyzing the alkoxy group of the silicon compound precursor, gelation and aging thereafter and heating and immobilization after formation of a void-provided structure can be achieved more efficiently.

The gelation of the silicon compound can be performed, for example, by a dehydration condensation reaction among the monomers. The dehydration condensation reaction is preferably performed in the presence of a catalyst, for example. Examples of the catalyst include dehydration condensation catalysts such as: acid catalysts including a hydrochloric acid, an oxalic acid, and a sulfuric acid; and base catalysts including ammonia, potassium hydroxide, sodium hydroxide, and ammonium hydroxide. The dehydration condensation catalyst is particularly preferably a base catalyst. In the dehydration condensation reaction, the amount of the catalyst to be added to the silicon compound is not particularly limited, and is, for example, 0.1 to 10 mol, 0.05 to 7 mol, or 0.1 to 5 mol per mol of the silicon compound.

The gelation of the silicon compound is preferably performed in a solvent, for example. The proportion of the monomer compound in the solvent is not particularly limited. Examples of the solvent include dimethylsulfoxide (DMSO), N-methylpyrrolidone (NMP), N,N-dimethylacetamide (DMAc), dimethylformamide (DMF), γ-butyrolactone (GBL), acetonitrile (MeCN), and ethylene glycol ethyl ether (EGEE). One of the solvents may be used alone or two or more of them may be used in combination, for example. Hereinafter, the solvent used for the gelation is also referred to as a "gelation solvent".

The condition for the gelation is not limited to particular conditions. Regarding the treatment of the solvent containing the monomer compound, the treatment temperature is, for example, 20° C. to 30° C., 22° C. to 28° C., or 24° C. to 26° C., and the treatment time is, for example, 1 to 60 minutes, 5 to 40 minutes, or 10 to 30 minutes. The treatment condition for the dehydration condensation reaction is not limited to particular conditions, and reference can be made to these examples. By gelation, a siloxane bond is grown and silica primary particles are formed. As the reaction further proceeds, the primary particles are connected in the form of a string of beads to generate a gel having a three-dimensional structure, for example.

The gelled silica compound obtained by the gelation is preferably subjected to aging treatment after the gelation reaction. The aging treatment causes further growth of the primary particle of a gel having a three-dimensional structure obtained by gelation, for example, and this allows the size of the particle itself to be increased. As a result, the contact state of the neck where particles are in contact with one another can be increased from a point contact to a surface contact. The gel which has been subjected to the aging treatment improves its strength, for example, and this improves the strength of the three-dimensional basic structure after pulverization. This prevents, in the drying step after coating of the pulverized product, the pore size of the void-provided structure obtained by deposition of the three-dimensional basic structures from shrinking in accordance with solvent volatilization during the drying process, for example.

The aging treatment can be performed, for example, by incubating the gelled compound at a predetermined temperature for a predetermined time. The predetermined temperature is not particularly limited, and the lower limit thereof is, for example, 30° C. or more, 35° C. or more, or 40° C. or more, the upper limit thereof is, for example, 80° C. or less, 75° C. or less, or 70° C. or less, and the predetermined temperature is, for example, in the range from 30° C. to 80° C., 35° C. to 75° C., or 40° C. to 70° C. The predetermined time is not particularly limited, and the lower limit is, for example, 5 hours or more, 10 hours or more, or 15 hours or more, the upper limit is, for example, 50 hours or less, 40 hours or less, or 30 hours or less, and the predetermined time is, for example, in the range from 5 hours to 50 hours, 10 hours to 40 hours, or 15 hours to 30 hours. An optimal condition for the aging is, for example, the condition mainly aiming for increase in the size of the silica primary particle and increase in the contact area of the neck. Furthermore, it is preferable to take the boiling point of a solvent to be used into consideration. For example, when the aging temperature is too high, there is a possibility that the solvent excessively volatilizes, which causes defectiveness such that the pore of the three-dimensional void-provided structure closes due to the condensation of the concentration of a coating liquid (gel liquid). On the other hand, for example, when the aging temperature is too low, there is a possibility not only that a sufficient effect of the aging is not brought about but also that temperature variations over time in a mass production process increase, which causes products with poor quality to be produced.

The same solvent as the solvent used in the gelation treatment can be used in the aging treatment, for example. Specifically, the aging treatment is preferably applied to a reactant (the solvent containing the gelled silica compound) after the gelation treatment. The mol number of residual silanol groups contained in the gel (the gelled silica compound, for example, the gelled silicon compound) after completion of the aging treatment after gelation is, for example, the proportion of the residual silanol group with the mol number of alkoxy groups of the added raw material (for example, the silicon compound precursor) being considered as 100, and the lower limit thereof is, for example, 50% or more, 40% or more, or 30% or more, the upper limit thereof is, for example, 1% or less, 3% or less, or 5% or less, and the mol number is, for example, in the range from 1% to 50%, 3% to 40%, or 5% to 30%. For the purpose of improving the hardness of a gel, for example, the lower the mol number of the residual silanol groups, the better. When the mol number of the silanol groups is too high, for example, there is a possibility that the void-provided structure cannot be held until crosslinking is done in the precursors of the silicone porous body. On the other hand, when the mol number of the silanol groups is too low, for example, there is a possibility that the pulverized products of the gelled compound cannot be crosslinked in a step of preparing the liquid containing microporous particles (for example, suspension) and/or subsequent steps, which hinders a sufficient film strength from being imparted. Note that while the aforementioned description is described with reference to a silanol group as an example, the same phenomenon shall be applied to various functional groups in the case where a monomer silicon compound is modified with various reactive functional groups, for example.

After gelation of the silicon compound in the gelation solvent, the obtained gelled silica compound is pulverized. The gelled silica compound in the gelation solvent which has not been processed may be pulverized or the gelation solvent may be substituted with another solvent and the gelled silica compound in the substituted solvent may be pulverized, for example. Furthermore, if the catalyst and solvent used in the gelation reaction remain after the aging step, which causes gelation of the liquid over time (pot life) and decreases the drying efficiency in the drying step, it is preferable to substitute the gelation solvent with another solvent. Hereinafter, such a solvent for substitution is also referred to as a "pulverization solvent".

The pulverization solvent is not limited to particular solvents, and can be, for example, an organic solvent. The organic solvent can be, for example, a solvent having a boiling point at 130° C. or less, 100° C. or less, or 85° C. or less. Specific examples of the organic solvent include isopropyl alcohol (IPA), ethanol, methanol, butanol, propylene glycol monomethyl ether (PGME), methyl cellosolve, acetone, and dimethylformamide (DMF). One of the pulverization solvents may be used alone or two or more of them may be used in combination.

The combination of the gelation solvent and the pulverization solvent is not limited to particular combinations, and the combination can be, for example, the combination of DMSO and IPA, the combination of DMSO and ethanol, the combination of DMSO and methanol, and the combination of DMSO and butanol. Substitution of the gelation solvent with the pulverization solvent makes it possible to form a coating film with uniform quality in the coating film formation described below, for example.

The method of pulverizing the gelled silica compound is not limited to particular methods. Examples of the apparatus for pulverizing include: pulverizing apparatuses utilizing a cavitation phenomenon such as an ultrasonic homogenizer and a high-speed rotating homogenizer; and pulverizing apparatuses of causing oblique collision of liquids at a high pressure. An apparatus such as a ball mill that performs media pulverization physically destroys the void-provided structure of a gel in pulverization, for example. On the other hand, a cavitation-type pulverizing apparatus such as a homogenizer, which is preferable in the present invention, peels the contact surface of silica particles, which are already contained in a gel three-dimensional structure and bonded relatively weakly, with a high speed shearing force owing to a media-less method, for example. Thus, a sol three-dimensional structure to be obtained can hold the void-provided structure having a particle size distribution of a certain range and can form the void-provided structure again by deposition in coating and drying, for example. The condition for the pulverization is not limited to particular conditions, and is preferably a condition that allows a gel to be pulverized without volatilizing a solvent by instantaneously imparting a high speed flow, for example. For example, it is preferable to pulverize the gelled silicon compound so as to obtain pulverized products having the above described particle size variations (for example, volume average particle size or particle size distribution). If the pulverization time, the pulverization strength, or the like is lacking, for example, there is a possibility not only that coarse particles remain, which hinders dense pores from being formed but also that defects in appearance increase, which hinders high quality from being achieved. On the other hand, if the pulverization time, the pulverization strength, or the like is too much, for example, there is a possibility that a finer sol particle than a desired particle size distribution is obtained and the size of a void space deposited after coating and drying is too fine to satisfy a desired porosity.

In the manner described above, a liquid (for example, suspension) containing the microporous particles (for example, pulverized products of a gelled silica compound) can be prepared. By further adding a catalyst for chemically bonding the microporous particles after or during the preparation of the liquid containing the microporous particles, a liquid containing the microporous particles and the catalyst can be prepared. The amount of the catalyst to be added is not particularly limited, and the amount of the catalyst to be added relative to the weight of the microporous particle is, for example, in the range from 0.01 wt % to 20 wt %, 0.05 wt % to 10 wt %, or 0.1 wt % to 5 wt %. This catalyst may be a catalyst that accelerates the crosslinking bond among the microporous particles, for example. As the chemical reaction of chemically bonding the microporous particles, it is preferable to utilize the dehydration condensation reaction of a residual silanol group contained in a silica sol molecule. By accelerating the reaction between the hydroxyl groups of the silanol group by the catalyst, the continuous formation of a film in which the void-provided structure is cured in a short time can be performed. Examples of the catalyst include photoactive catalysts and thermoactive catalysts. The photoactive catalyst allows the chemical bond (for example, crosslinking bond) among the microporous particles without heating in the void-provided layer forming step, for example. This makes it possible to maintain a higher proportion of void space because the shrinkage of the whole void-provided layer in the void-provided layer forming step is less liable to occur, for example. In addition to or instead of the catalyst, a substance (catalyst generator) that generates a catalyst may be used. For example, in addition to or instead of the photoactive catalyst, a substance (photocatalyst generator) that generates a catalyst by light irradiation may be used. For example, in addition to or instead of thermoactive catalyst, a substance (thermal catalyst generator) that generates a catalyst by heating may be used. The photocatalyst generator is not limited to particular photocatalyst generators, and examples thereof include photobase generators (substances that generate basic catalysts by light irradiation) and photoacid generators (substances that generate acidic catalysts by light irradiation). Among them, the photobase generator is preferable. Examples of the photobase generator include 9-anthrylmethyl N,N-diethylcarbamate (product name: WPBG-018), (E)-1-[3-(2-hydroxyphenyl)-2-propenoyl]piperidine (product name: WPBG-027), 1-(anthraquinon-2-yl)ethyl imidazolecarboxylate (product name: WPBG-140), 2-nitrophenylmethyl 4-methacryloyloxypiperidine-1-carboxylate (product name: WPBG-165), 1,2-diisopropyl-3-[bis(dimethylamino) methylene]guanidium 2-(3-benzoylphenyl)propionate (product name: WPBG-266), 1,2-dicyclohexyl-4,4,5,5-tetramethylbiguanidium n-butyltriphenylborate (product name: WPBG-300), 2-(9-oxoxanthen-2-yl)propionic acid 1,5,7-triazabicyclo[4.4.0]dec-5-ene (Tokyo Kasei Kogyo Co., Ltd.), and a compound containing 4-piperidinemethanol (product of Heraeus, product name: HDPD-PB100). Note here that each product with the name including "WPBG" is a product of Wako Pure Chemical Industries, Ltd. The photoacid generator can be, for example, a triarylsulfonyl compound or the like. The catalyst for chemically bonding the microporous particles is not limited to the photoactive catalyst and the photocatalyst generator, and can be, for example, a thermoactive catalyst or a thermal catalyst generator such as urea. Examples of the catalyst for chemically bonding the microporous particles include base catalysts such as potassium hydroxide, sodium hydroxide, and ammonium hydroxide; and acid catalysts such as a hydrochloric acid, an acetic acid, and an oxalic acid. Among them, the base catalyst is preferable. The catalyst or the catalyst generator for chemically bonding the microporous particles can be used by adding it to a sol particle liquid (for example, suspension) containing the pulverized products (microporous particles) right before the coating, or the catalyst or the catalyst generator can be used as a mixture by mixing it with a solvent, for example. The mixture may be, for example, a coating liquid obtained by adding the catalyst or the catalyst generator directly to the sol particle liquid, a solution obtained by dissolving the catalyst or the catalyst generator in a solvent, or a dispersion liquid obtained by dispersing the catalyst or the catalyst generator into a solvent. The solvent is not limited to particular solvents, and examples thereof include water, buffer solutions, and various organic solvents.

For example, in the case where the microporous particle is a pulverized product of a gelled silicon compound obtained from a silicon compound containing at least three or less functional groups having saturated bonds, a crosslinking assisting agent for indirectly bonding the microporous particles may further be added after or during preparation of a liquid containing the microporous particles. This crosslinking assisting agent penetrates among particles and interacts with or bonds to the particles, which helps to bond particles relatively distanced from one another and makes it possible to increase the strength efficiently. As the crosslinking assisting agent, a multi-crosslinking silane monomer is preferable. Specifically, the multi-crosslinking silane monomer may have at least two and at most three alkoxysilyl groups, the chain length between the alkoxysilyl groups may be 1-10C, and the multi-crosslinking silane monomer may contain an element other than carbon, for example. Examples of the crosslinking assisting agent include bis(trimethoxysilyl)ethane, bis(triethoxysilyl)ethane, bis(trimethoxysilyl)methane, bis(triethoxysilyl)methane, bis(triethoxysilyl)propane, bis(trimethoxysilyl)propane, bis(triethoxysilyl)butane, bis(trimethoxysilyl)butane, bis(triethoxysilyl)pentane, bis(trimethoxysilyl)pentane, bis (triethoxysilyl)hexane, bis(trimethoxysilyl)hexane, bis (trimethoxysilyl)-N-butyl-N-propyl-ethane-1,2-diamine, tris-(3-trimethoxysilylpropyl)isocyanurate, and tris-(3-triethoxysilylpropyl)isocyanurate. The amount of the crosslinking assisting agent to be added is not particularly limited, and the amount of the crosslinking assisting agent to be added relative to the weight of the silicon compound microporous particle is, for example, in the range from 0.01 wt % to 20 wt %, 0.05 wt % to 15 wt %, or 0.1 wt % to 10 wt %.

[2.3.1.2 Details of Coating Step]

Subsequently, a resin film (hereinafter, also referred to as a "base") is coated with the liquid containing the microporous particles (for example, suspension) (coating step). The coating can be performed, for example, by the various coating methods described below but not limited thereto. By directly coating the resin film with the liquid containing the microporous particles (for example, pulverized products of a gelled silica compound), a coating film containing the microporous particles and the catalyst can be formed. The coating film can also be referred to as a coating layer, for example. Hereinafter, the coating film (coating layer) is also referred to as a "uncrosslinked film" Formation of the coating film (uncrosslinked film) causes the settlement and deposition of the pulverized product whose three-dimensional structure has been destroyed, for example, and this allows a new three-dimensional structure to be formed. Note that the microporous particle-containing liquid may not contain a catalyst for chemically bonding the microporous particles, for example. For example, as described below, the void-provided layer forming step may be performed after the catalyst has been sprayed to the coating film (uncrosslinked film) or while spraying the catalyst to the coating film (uncrosslinked film). On the other hand, the microporous particle-containing liquid may contain a catalyst for chemically bonding the microporous particles, and the porous body (void-provided layer) may be formed by chemically bonding the microporous particles by the catalysis of the catalyst contained in the coating film (uncrosslinked film).

The solvent (hereinafter, also referred to as a "coating solvent") is not limited to particular solvents, and can be, for example, an organic solvent. The organic solvent can be, for example, a solvent having a boiling point at 130° C. or less. Specific examples of the solvent include IPA, ethanol, methanol, and butanol, and the examples of the pulverization solvent described above can be used. In the case where the present invention includes a step of pulverizing the gelled silica compound, for example, the pulverization solvent containing the pulverized products of the gelled silica compound can be used without processing in the step of forming the coating film (uncrosslinked film).

In the coating step, for example, it is preferable to coat the base with the sol pulverized products dispersed in the solvent (hereinafter, also referred to as a "sol particle liquid"). After coating the base with the sol particle liquid of the present invention and drying it, by chemically crosslinking the particles, the continuous formation of a void-provided layer having a film strength of a certain level or more can be performed. The "sol" in the present invention denotes a fluidic state in which silica sol particles each having a nano three-dimensional structure holding a part of the void-provided structure are dispersed in a solvent by pulverization of the three-dimensional structure of a gel.

The concentration of the pulverized product in the solvent is not particularly limited, and is, for example, in the range from 0.3% to 50% (v/v), 0.5% to 30% (v/v), or 1.0% to 10% (v/v). When the concentration of the pulverized product is too high, there is a possibility that the fluidity of the sol particle liquid decreases significantly, which causes aggregates and coating stripes in coating, for example. On the other hand, when the concentration of the pulverized product is too low, there is a possibility not only that the drying of the sol particle solvent takes a relatively long time but also that the residual solvent right after the drying increases, which may decrease the porosity, for example.

There is no particular limitation on the physical property of the sol. The shear viscosity of the sol is, for example, 100 cPa·s or less, 10 cPa·s or less, or 1 cPa·s or less, for example, at the shear rate of 1000l/s. When the shear viscosity is too high, for example, there is a possibility that the coating stripes are generated, which causes defectiveness such as decrease in the transfer rate in the gravure coating. In contrast, when the shear viscosity is too low, for example, there is a possibility that the thickness of the wet coating (coating) during coating cannot be increased and a desired thickness cannot be obtained after drying.

The coating amount of the pulverized product relative to the base is not particularly limited, and can be determined appropriately, for example, according to the thickness of a desired silicone porous body. As a specific example, in the case of forming the silicone porous body having a thickness of 0.1 μm to 1000 μm, the coating amount of the pulverized product relative to the base is, for example, in the range from 0.01 μg to 60000 μg, 0.1 μg to 5000 μg, or 1 μg to 50 μg per square meter of the base. Although it is difficult to uniquely define a preferable coating amount of the sol particle liquid because it depends on the concentration of a liquid, the coating method, or the like, for example, it is preferable that a coating layer is as thin as possible in consideration of productivity. When the coating amount (application amount) is too much, for example, there is a high possibility that a solvent is dried in a drying oven before volatilizing. When the solvent is dried before forming the void-provided structure by the settlement and deposition of the nano pulverized sol particles in the solvent, there is a possibility that formation of void spaces is inhibited and the proportion of void space decreases. On the other hand, when the coating amount is too little, there is a possibility of increasing the risk of causing coating cissing due to unevenness of a base, variations in hydrophilicity and hydrophobicity, and the like.

[2.3.1.3 Details of Drying Step]

Furthermore, for example, the production method of the present invention includes a step of drying the coating film (uncrosslinked film) produced by applying the microporous particle-containing liquid as described above. The drying treatment in the drying step is aimed not only for removing the solvent (solvent contained in the sol particle liquid) from the coating film (uncrosslinked film) but also for causing the settlement and deposition of the sol particles to form a void-provided structure in the drying treatment, for example. The temperature for the drying treatment is, for example, in the range from 50° C. to 250° C., 60° C. to 150° C., or 70° C. to 130° C., and the time for the drying treatment is, for example, in the range from 0.1 minutes to 30 minutes, 0.2 minutes to 10 minutes, or 0.3 minutes to 3 minutes. Regarding the temperature and time for the drying treatment in relation to continuous productivity and high porosity expression, the lower the better and the shorter the better, for example. When the condition is too strict, there is a possibility of causing the following problems, for example. That is, when the base is a resin film, for example, the base extends in a drying oven as the temperature approaches the glass-transition temperature of the base, which causes defects such as cracks in a formed void-provided structure right after coating. On the other hand, when the condition is too mild, there is a possibility of causing the following problems, for example. That is, since the film contains a residual solvent when it comes out of the drying oven, defects in appearance such as scratches are caused when the film rubs against a roller in the next step.

The drying treatment may be, for example, natural drying, drying by heating, or drying under reduced pressure. The drying method is not limited to particular methods, and a common heating unit can be used, for example. Examples of the heating unit include a hot air fan, a heating roll, and a far-infrared heater. Among them, in view of performing continuous production industrially, drying by heating is preferable. The solvent to be used is preferably a solvent having a low surface tension in view of reducing the shrinkage stress in accordance with the solvent volatilization in drying and reducing the crack phenomenon of the void-provided layer (the silicone porous body) due to the shrinkage stress. The solvent can be, for example, lower alcohol typified by isopropyl alcohol (IPA), hexane, perfluorohexane, and the like. The solvent, however, is not limited thereto. The surface tension may be reduced by adding a small amount of a perfluoro surfactant or a small amount of a silicon surfactant to the IPA and the like.

Furthermore, in the production method of a laminated optical film of the present invention, for example, the porous body (void-provided layer) is formed by chemically bonding the microporous particles by the catalysis of the catalyst (void-provided layer forming step). Thereby, the three-dimensional structure of the pulverized product in the coating film (uncrosslinked film) is immobilized, for example. In the case of immobilizing the three-dimensional structure by conventional sintering, for example, the dehydration condensation of a silanol group and the formation of a siloxane bond are induced by high temperature treatment at 200° C. or more. In the present invention, for example, the void-provided structure can be formed and immobilized continuously at about 100° C. which is relatively low for less than several minutes which is short without damaging the base (resin film) by causing various additives, which catalyze the dehydration condensation reaction, to react.

The method of chemically bonding the particles is not limited to particular methods, and can be determined appropriately according to the type of the gelled silicon compound, for example. Specifically, for example, the chemical bond can be a chemical crosslinking bond among the pulverized products. Besides this, for example, when inorganic particles such as titanium oxide particles are added to the pulverized products, the inorganic particles and the pulverized products can be chemically bonded by crosslinking. Furthermore, there are a case of using a biocatalyst such as an enzyme and a case of chemically crosslinking the pulverized product and a catalyst at a site which is different from a catalytic activity site. Thus, the present invention can be applied not only to a void-provided layer (silicone porous body) formed of the sol particles but also to an organic-inorganic hybrid void-provided layer, a host-guest void-provided layer, and the like, for example. The present invention, however, is not limited thereto.

It is not particularly limited at which stage the chemical reaction in the presence of the catalyst (void-provided layer forming step) is performed (caused) in the production method of the present invention. For example, in the production method of a laminated optical film of the present invention, the drying step may also serve as the void-provided layer forming step. Furthermore, for example, the void-provided layer forming step of chemically bonding the microporous particles by the catalysis of the catalyst may be performed after the drying step. For example, as described above, the catalyst may be a photoactive catalyst, and the porous body (void-provided layer) may be formed by chemically bonding the microporous particles by light irradiation in the void-provided layer forming step. Furthermore, the catalyst may be a thermoactive catalyst, and the porous body (void-provided layer) may be formed by chemically bonding the microporous particles by heating in the void-provided layer forming step.

The chemical reaction can be performed, for example, by heating the coating film containing the catalyst or the catalyst generator preliminarily added to the sol particle liquid (for example, suspension) or irradiating the coating film containing the catalyst or the catalyst generator preliminarily added to the sol particle liquid with light, by heating the coating film or irradiating the coating film with light after the catalyst or the catalyst generator has been sprayed to the coating film, or by heating the coating film or irradiating the coating film with light while spraying the catalyst or the catalyst generator to the coating film. The accumulated light amount in the light irradiation is not particularly limited, and is, for example, in the range from 200 to 800 mJ/cm$^2$, 250 to 600 mJ/cm$^2$, or 300 to 400 mJ/cm$^2$ in terms of the wavelength at 360 nm. From the viewpoint of preventing the effect from being insufficient due to the delay of decomposition of the catalyst generator by light absorption because of insufficient irradiation amount, the accumulated light amount is preferably 200 mJ/cm$^2$ or more. From the viewpoint of preventing heat wrinkles from generating due to the damage on a base below a void-provided layer, the accumulated light amount is preferably 800 mJ/cm$^2$ or less. The conditions for the heat treatment are not limited to particular conditions. The heating temperature is, for example, 50° C. to 250° C., 60° C. to 150° C., or 70° C. to 130° C., the heating time is, for example, 0.1 to 30 minutes, 0.2 to 10 minutes, or 0.3 to 3 minutes. The step of drying the sol particle liquid (for example, suspension) may also serve as a step of performing a chemical reaction in the presence of the catalyst as described above. That is, in the step of drying the sol particle liquid (for example, suspension), the pulverized products (microporous particles) may be chemically bonded in the presence of the catalyst. In this case, by further heating the coating film after the drying step, the pulverized products (microporous particles) may be bonded more firmly. It is presumed that the chemical reaction in the presence of the catalyst may be caused also in the step of preparing the liquid (for example, suspension) containing the microporous particles and the step of coating the resin film with the liquid containing microporous particles. This presumption, however, does not limit the present invention by any means. The solvent to be used is preferably a solvent having a low surface tension in view of reducing the shrinkage stress in accordance with the solvent volatilization in drying and reducing the crack phenomenon of the void-provided layer due to the shrinkage stress, for example. The solvent can be, for example, lower alcohol typified by isopropyl alcohol (IPA), hexane, perfluorohexane, or the like. The solvent, however, is not limited thereto.

[2.3.1.4 Details of Strength Improving Step (Aging Step)]

Furthermore, the void-provided layer of the present invention may be subjected to a strength improving step (aging step) of applying thermal aging to improve the strength, for example. In the strength improving step (aging step), for example, the void-provided layer of the present invention may be heated. The temperature in the strength improving step (aging step) is, for example in the range from 30° C. to 80° C., 35° C. to 70° C., 40° C. to 60° C., or 50° C. to 60° C. The time for the aging step is, for example, in the range from 1 to 50 hours, 3 to 40 hours, 5 to 30 hours, or 7 to 25 hours. By setting the heating temperature low in the aging step, for example, the peel strength can be improved while reducing the shrinkage of the void-provided layer, thereby achieving both a high proportion of void space and superior high strength.

[2.3.2 Details of Cover Layer Forming Step]

Subsequently, the cover layer is formed directly on the void-provided layer (cover layer forming step). The cover layer may be formed on the void-provided layer by adhering the cover layer on the void-provided layer in the cover layer forming step. The cover layer forming step is not particularly limited and includes, for example, the cover layer raw material liquid coating step, the cover layer raw material liquid drying step, and the cover layer strength improving step (aging step).

[2.3.2.1 Details of Cover Layer Raw Material Liquid Coating Step]

First, for example, the cover layer raw material liquid containing the raw material of the cover layer is applied directly to the void-provided layer (cover layer raw material liquid coating step). The cover layer raw material liquid coating step may use the same coating method as in the void-provided layer forming step. Furthermore, regarding a coating solvent in the cover layer raw material liquid coating step, reference can be made to examples of the coating solvent described in the description as to void-provided layer forming step.

[2.3.2.2 Details of Cover Layer Raw Material Liquid Drying Step]

Subsequently, for example, the applied cover layer raw material-containing liquid is dried (cover layer raw material liquid drying step). Regarding the temperature and the time of the drying treatment, reference can be made to examples of the temperature and the time described in the description as to the drying step of the void-provided layer forming step.

In the cover layer forming step, the cover layer is formed by at least one of heating and light irradiation after the cover layer raw material liquid drying step. In the cover layer forming step, for example, the compounds in the cover layer and the microporous particles in the void-provided layer may be chemically bonded by light irradiation. In the cover layer forming step, for example, the catalyst may be a thermoactive catalyst, and the compounds in the cover layer and the microporous particles in the void-provided layer may be chemically bonded by heating. The amount of light in the light irradiation and the temperature and the time of the heat treatment are not particularly limited, and reference can be made to examples described in the description as to the void-provided layer forming step.

[2.3.2.3 Details of Strength Improving Step]

In the cover layer forming step, for example, another heat treatment of 80° C. or less may be performed for 1 hour or more to improve the strength of the formed cover layer (strength improving step (aging step)). The upper limit of the heating temperature is, for example, 80° C. or less, 70° C. or less, or 60° C. or less, the lower limit of the heating temperature is, for example 30° C. or more, 35° C. or more, or 40° C. or more, and the range of the heating temperature is, for example, 30° C. or more and 80° C. or less, 35° C. or more and 70° C. or less, or 40° C. or more and 60° C. or less. The lower limit of the heating time is, for example, 1 hour or more, 3 hours or more, or 4 hours or more, the upper limit of the heating time is, for example, 50 hours or less, 40 hours or less, or 30 hours or less, and the range of the heating time is, for example, 1 hour or more and 50 hours or less, 3 hours or more and 40 hours or less, or 4 hours or more and 30 hours or less.

The laminated optical film of the present invention can be produced in the manner as described above. For example, the laminated optical film produced by the production method of the present invention can be a porous body in the form of a roll, which brings about advantageous effects such as superior manufacturing efficiency, superior handleability, and the like.

The thus obtained laminated optical film (void-provided layer) of the present invention may further be formed on another film (layer) to form a laminate having the porous structure, for example. In this case, the components of the laminate may be formed through a pressure-sensitive adhesive or an adhesive, for example.

[2.4 Details of Production Method of Laminated Optical Film Using Long Film]

The components may be laminated by continuous treatment (so called Roll to Roll) using a long film, for example, in terms of efficiency. When the base is a molded product, an element, or the like, the base that has been subjected to a batch process may be laminated.

The method of forming a void-provided layer and a cover layer of the present invention on a base (resin film) is described below with reference to a continuous treatment process using FIGS. 1 to 3 as an example. FIG. 2 shows a step of adhering a protective film to a formed silicone porous body and winding the laminate. In the case of forming the silicone porous body on another functional film, the aforementioned method may be adopted or the formed silicone porous body may be adhered to another functional film that has been coated and dried, right before winding. The method of forming a film shown in FIG. 2 is an example, and the present invention is not limited thereto.

The base may be the resin film described in the description as to the laminated optical film of the present invention. In this case, the void-provided layer of the present invention can be obtained by forming the void-provided layer on the base. The void-provided layer of the present invention can be obtained also by forming the void-provided layer on the base and then stacking the void-provided layer with the base on the resin film described in the description as to the void-provided layer of the present invention.

Figure 2:
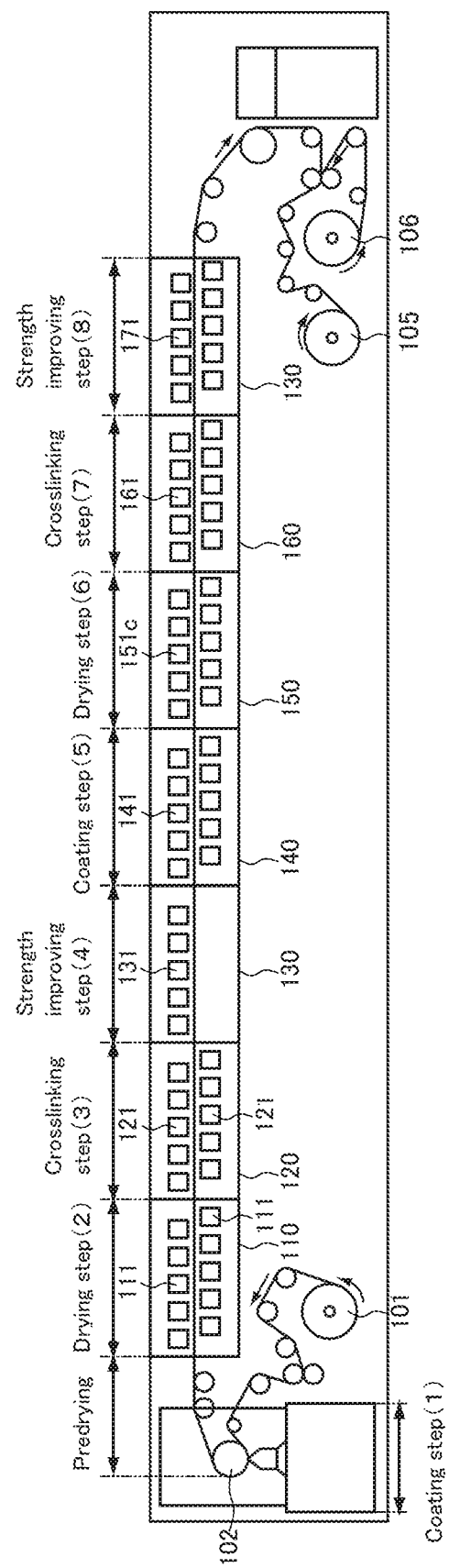
FIG. 2 is an illustration schematically showing an example of a part of the process of producing a rolled laminated optical film of the present invention (hereinafter, also referred to as a "laminated optical film roll of the present invention") and an example of the apparatus used therefore.

FIG. 1 is a cross sectional view schematically showing an example of the process of forming the void-provided layer and the cover layer on the base (resin film) in this order in the present invention. In FIG. 1, the method of forming the void-provided layer includes: (1) a coating step of coating a base (resin film) 10 with a sol particle liquid 20" containing microporous particles; (2) a drying step of drying the sol particle liquid 20" to form a dried coating film 20'; (3) a chemical treatment step (for example, crosslinking step) of applying chemical treatment (for example, crosslinking treatment) to the coating film 20' to form a void-provided layer 20; (4) a strength improving step of improving the strength of the void-provided layer 20 to form a void-provided layer 21 with improved strength; (5) a cover layer coating step (cover layer raw material liquid coating step) of applying a cover layer raw material liquid 22" directly to the void-provided layer 21; (6) a drying step of drying the applied cover layer raw material liquid 22" to form a dried coating film 22'; (7) a chemical treatment step (for example, crosslinking step) of applying chemical treatment (for example, crosslinking treatment) after the drying step to form a cover layer 22; and (8) a strength improving step of improving the strength of the cover layer 22 to form a cover layer 23 with improved strength. By conducting the steps (1) to (8), as shown in FIG. 1, a laminated optical film in which the void-provided layer 21 and the cover layer 23 are formed in this order on the resin film 10 can be produced. The production method of a laminated optical film of the present invention may further include steps besides the steps (1) to (8), appropriately. The step (4) may also serve as the step (8) of the cover layer. That is, in the (8) strength improving step of the cover layer, the strength of the void-provided layer may also be improved.

In the (1) coating step, the method of coating the base with the sol particle liquid 20" is not limited to particular methods, and a common method can be adopted. Examples of the method include a slot die method, a reverse gravure coating method, a micro-gravure method (micro-gravure coating method), a dip method (dip coating method), a spin coating method, a brush coating method, a roller coating method, a flexography, a wire-bar coating method, a spray coating method, an extrusion coating method, a curtain coating method, and a reverse coating method. Among them, from the viewpoint of productivity, smoothness of a coating film, and the like, an extrusion coating method, a curtain coating method, a roller coating method, a micro-gravure coating method, and the like are preferable. The coating amount of the sol particle liquid 20" is not particularly limited, and can be determined appropriately so as to obtain a void-provided layer 20 having an appropriate thickness, for example. The thickness of the void-provided layer 21 is not particularly limited, and is, for example, as described above.

In the (2) drying step, the sol particle liquid 20" is dried (i.e., dispersion medium contained in sol particle liquid 20" is removed) to form a coating film after drying (a precursor of the void-provided layer) 20'. There is no particular limitation on the condition for the drying treatment, and is as described above.

In the (3) chemical treatment step, the coating film 20' containing the catalyst (for example, photoactive catalyst, photocatalyst generator, thermoactive catalyst, or thermal catalyst generator) which has been added before coating is irradiated with light or heated to chemically bond (for example, crosslink) the microporous particles in the coating film 20', thereby forming a void-provided layer 20. The conditions for the light irradiation and heating in the (3) chemical treatment step are not limited to particular conditions, and are as described above.

Furthermore, in the (4) strength improving step, the strength of the void-provided layer 20 is improved. The treatment temperature and the treatment time in the (4) strength improving step are not particularly limited, and are as described above. The step (4) may be performed at the same time as the step (8), and the (5) cover layer coating step may be performed immediately after the (3) treatment step. In this case, the void-provided layer may be once wound before the step (5) or the (5) coating step may be performed continuously without winding the void-provided layer.

Furthermore, in the (5) coating step, the cover layer raw material liquid 22" coating method is not particularly limited, and can be the method described in the description as to the (1) coating step. The amount of the cover layer raw material liquid 22" to be applied is not particularly limited and can be determined appropriately so that the cover layer 22 has an appropriate thickness. The thickness of the cover layer 22 is not particularly limited, and is as described above.

Furthermore, in the (6) drying step, the conditions of the drying treatment for drying the cover layer raw material liquid 22" are not particularly limited, and can be the same conditions as in the (2) drying step.

Furthermore, in the (7) chemical treatment step, by light irradiation or heating, microporous particles in the void-provided layer 21 and compounds in the cover layer raw material liquid 22" are chemically bonded (for example, crosslinked) to form the cover layer 22. The conditions of light irradiation and heating in the (7) chemical treatment step are not particularly limited and can be the same as the conditions in the (3) chemical treatment step.

Furthermore, in the (8) strength improving step, the strength of the cover layer 22 is improved. The treatment temperature and the treatment time in the (8) strength improving step are not particularly limited, and are as described above.

FIG. 2 schematically shows an example of a slot die coating apparatus and an example of the method of forming a void-provided layer using the same. Although FIG. 2 is a cross sectional view, hatching is omitted for viewability.

As shown in FIG. 2, the steps of the method using this apparatus are carried out while carrying a base 10 in one direction by rollers. The carrying speed is not particularly limited, and is, for example, in the range from 1 to 100 m/min, 3 to 50 m/min, or 5 to 30 m/min.

First, the base 10 is delivered from a delivery roller 101 and carried to a coating roller 102, and the (1) coating step of coating the base 10 with a sol particle liquid 20" is carried out using the coating roller 102. Subsequently, the (2) drying step is carried out in an oven zone 110. In the coating apparatus shown in FIG. 2, a predrying step is carried out after the (1) coating step and before the (2) drying step. The predrying step can be carried out at room temperature without heating. In the (2) drying step, a heating unit 111 is used. As the heating unit 111, as described above, a hot air fan, a heating roll, a far-infrared heater, or the like can be used appropriately. For example, the (2) drying step may be divided into multiple steps, and the drying temperature may be set higher as coming to later steps.

The (3) chemical treatment step is carried out in a chemical treatment zone 120 after the (2) drying step. In the (3) chemical treatment step, for example, when the coating film 20' after drying contains a photoactive catalyst, light is emitted from lamps (light irradiation units) 121 disposed above and below the base 10. On the other hand, for example, when the coating film 20' after drying contains a thermoactive catalyst, the base 10 is heated using hot air fans 121 disposed above and below the base 10 instead of using the lamps (light irradiation devices) 121. By this crosslinking treatment, the microporous particles in the coating film 20' are chemically bonded, and the void-provided layer 20 is cured and strengthened. Note that, although the (3) chemical treatment step is performed after the (2) drying step in the present example, as described above, there is no particular limitation at which stage in the production method of the present invention the chemical bond among the microporous particles is caused. For example, as described above, the (2) drying step may also serve as the (3) chemical treatment step. Even when the chemical bond is caused in the (2) drying step, the (3) chemical treatment step may be performed to make the chemical bond among the microporous particles firmer. Furthermore, in the steps (for example, predrying step, the (1) coating step, step of preparing a coating liquid (for example, suspension), and the like) before the (2) drying step, the chemical bond among the pulverized products may be caused.

After the (3) chemical treatment step, the (4) strength improving step is performed in a strength improving zone 130. In the (4) strength improving step, for example, the void-provided layer 20 may be heated using hot air fans (heating units) 131 provided above the base 10. The heating temperature, the heating time, and the like are not particularly limited, and are, for example, as described above.

After the (4) strength improving step, the (5) coating step is performed in a cover layer coating zone 140. In the (5) coating step, for example, the cover layer raw material liquid is applied directly to the void-provided layer 20 using cover layer coating units 141. As described above, instead of application of the cover layer raw material liquid, a tape including a cover layer may be taped on the void-provided layer 20.

After the (5) coating step, the (6) drying step is performed in an oven zone 150 using heating units 151. Prior to the (6) drying step, a predrying step at room temperature or the like may be performed. The (6) drying step may be divided into multiple steps, and the drying temperature may be set higher as coming to later steps. As the heating units 151, the heating units 111 described in the description as to the drying step (2) can be used.

After the (6) drying step, the (7) chemical treatment step is performed in a chemical treatment zone 160 using light irradiation units or heating units 161. In the (7) chemical treatment step, for example, crosslinking is done by the chemical bond among compounds in a cover layer and microporous particles in a void-provided layer.

After the (7) chemical treatment step, the (8) strength improving step is performed in a strength improving zone 170 using heating units 171. The heating temperature and the treatment time in the (8) strength improving step are as described above.

Regarding the formation of the void-provided layer and the cover layer, for example, the (5) coating step, the (6) drying step, and the (7) chemical treatment step may be performed prior to the (4) strength improving step (aging step), and the (4) strength improving step (aging step) may be performed by heating the void-provided layer using the heating units 171 at the time of improving the strength of the cover layer using the heating units 171 in (8) the strength improving step (aging step). This allows gelation of the compounds in the cover layer and the microporous particles in the void-provided layer at the same time, for example, thereby improving the adhesion between the cover layer and the void-provided layer as well as improving the abrasion resistance of the cover layer.

After the (8) strength improving step, a laminate is wound by a winding roller 105. Note that the laminate may be coated with a protecting sheet delivered from a roller 106, for example. The laminate may be coated with another layer formed of a long film instead of the protecting sheet.

Figure 3:
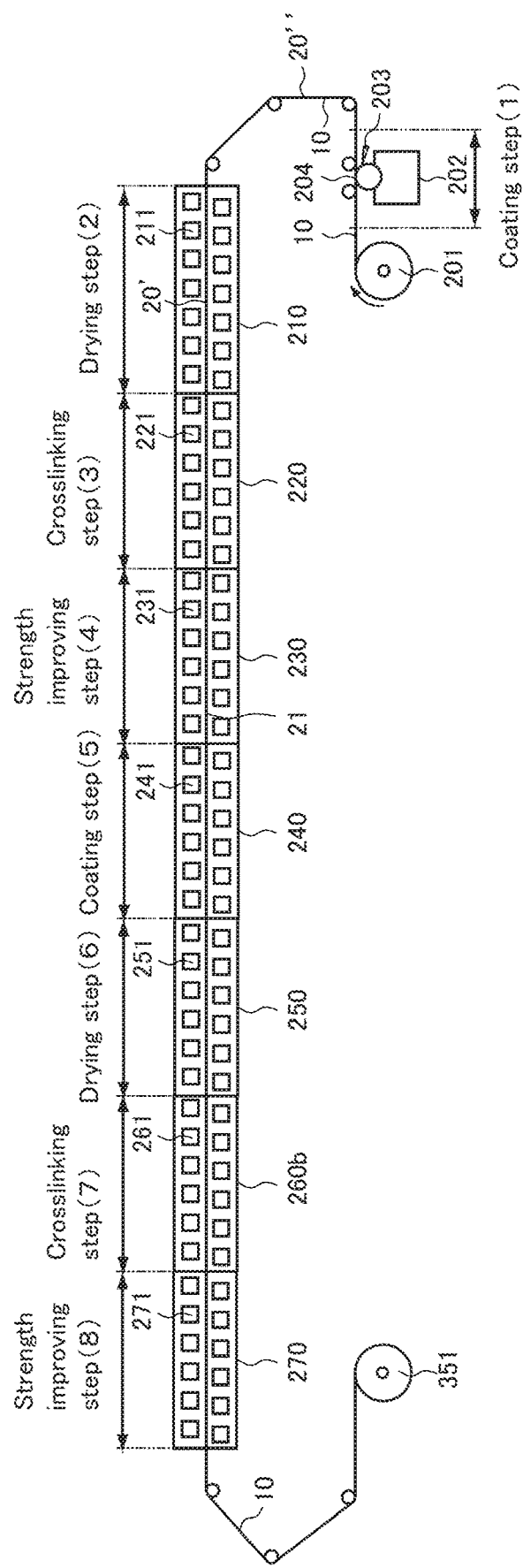
FIG. 3 is an illustration schematically showing another example of a part of the process of producing a laminated optical film roll of the present invention and another example of the apparatus used therefore.

FIG. 3 schematically shows an example of a microgravure coating apparatus and an example of the method of forming a void-provided layer using the same. Although FIG. 3 is a cross sectional view, hatching is omitted for viewability.

As shown in FIG. 3, the steps of the method using this apparatus are carried out while carrying the base 10 in one direction by rollers as in FIG. 2. The carrying speed is not particularly limited, and is, for example, in the range from 1 to 100 m/min, 3 to 50 m/min, or 5 to 30 m/min.

First, the (1) coating step of coating the base 10 with a sol particle liquid 20" is carried out while carrying the base 10 delivered from a delivery roller 201. As shown in FIG. 3, the coating with the sol particle liquid 20" is performed using a liquid reservoir 202, a doctor (doctor knife) 203, and a micro-gravure 204. Specifically, the sol particle liquid 20' in the liquid reservoir 202 is applied to the surface of the micro-gravure 204 and the coating of the surface of the base 10 is performed using the micro-gravure 204 while controlling the thickness to a predetermined thickness using a doctor 203. The micro-gravure 204 is merely an illustrative example. The present invention is not limited thereto, and any other coating unit may be adopted.

Subsequently, the (2) drying step is performed. Specifically, as shown in FIG. 3, the base 10 coated with the sol particle liquid 20" is carried into an oven zone 210 and the sol particle liquid 20" is dried by heating using heating units 211 disposed in the oven zone 210. The heating units 211 can be, for example, the same as those shown in FIG. 2. For example, the (2) drying step may be divided into multiple steps by dividing the oven zone 210 into multiple sections, and the drying temperature may be set higher as coming to later steps. The (3) chemical treatment step is carried out in a chemical treatment zone 220 after the (2) drying step. In the (3) chemical treatment step, for example, when the coating film 20' after drying contains a photoactive catalyst, light is emitted from lamps (light irradiation units) 221 disposed above and below the base 10. On the other hand, for example, when the coating film 20' after drying contains a thermoactive catalyst, the base 10 is heated using hot air fans (heating units) 221 disposed above and below the base 10 instead of using lamps (light irradiation devices) 221. By this crosslinking treatment, the pulverized products in the coating film 20' are chemically bonded, and the void-provided layer 20 is formed.

The (4) strength improving step is performed in the strength improving zone 230 after the (3) chemical treatment step. In the (4) strength improving step, for example, the void-provided layer 20 may be heated using hot air fans (heating units) 231 disposed above and below the base 10. The heating temperature, the time, and the like are not particularly limited, and can be, for example, as described above.

After the (4) strength improving step, the (5) coating step is performed in a cover layer coating zone 240. In the (5) coating step, for example, the cover layer raw material liquid is applied directly to the void-provided layer 20 using cover layer coating units 241. Furthermore, as described above, instead of application of the cover layer raw material liquid, a tape including a cover layer may be taped on the void-provided layer 20.

After the (5) coating step, the (6) drying step is performed in an oven zone 250 using heating units 251. Prior to the (6) drying step, a predrying step at room temperature or the like may be performed. The (6) drying step may be divided into multiple steps, and the drying temperature may be set higher as coming to later steps. As the heating units 251, the heating units 211 described in the description as to the drying step (2) can be used.

After the (6) drying step, the (7) chemical treatment step is performed in a chemical treatment zone 260 using light irradiation units or heating units 261. In the (7) chemical treatment step, for example, crosslinking is done by the chemical bond among compounds in a cover layer and microporous particles in a void-provided layer.

After the (7) chemical treatment step, the (8) strength improving step is performed in a strength improving zone 270. The heating temperature and the treatment time in the (8) strength improving step are as described above.

[3. Optical Element]

The optical element of the present invention, as described above, includes the laminated optical film of the present invention. The optical element of the present invention is characterized in that it includes the laminated optical film of the present invention, and other configurations are by no means limited. The optical element of the present invention may further include another layer besides the laminated optical film of the present invention, for example.

Furthermore, the optical element of the present invention includes the laminated optical film of the present invention as a low reflective layer, for example. The optical element of the present invention may further include another layer besides the laminated optical film of the present invention, for example. The optical element of the present invention is, for example, in the form of a roll.

[4. Image Display]

The image display of the present invention, as described above, includes the optical element of the present invention. The image display of the present invention is characterized in that it includes the optical element of the present invention, and other configurations are by no means limited. The image display of the present invention may further include other components besides the optical element of the present invention, for example.

EXAMPLES

The examples of the present invention are described below. The present invention, however, is not limited by the following examples.

Examples

In Examples of the present invention, laminated optical films of the present invention were produced as described below. The amount of the substance used in the production is expressed in parts by weight (parts by mass), unless otherwise stated. Furthermore, the concentration (%) is expressed in wt %, unless otherwise stated.

Reference Example 1: Formation of Void-Provided Layer 8 parts by mass of methyltrimethoxysilane was dissolved in 18 parts by mass of DMSO. 4 parts by mass of 0.01 mol/L oxalic acid aqueous solution was added to the mixture, and the resultant was stirred at room temperature for 30 minutes to hydrolyze methyltrimethoxysilane. Furthermore, 65 parts by mass of DMSO, 3 parts by mass of ammonia water having a concentration of 28%, and 2 parts by mass of pure water were added thereto, and the resultant was stirred at room temperature for 15 minutes and subjected to the thermal aging at 40° C. for 20 hours, thereby obtaining a gelled compound. The gelled compound was granulated into pieces of several millimeters to several centimeters, IPA 4 times the amount of gel was added thereto, and the mixture was stirred lightly and then was allowed to stand still at room temperature for 6 hours, thereby decanting a solvent and a catalyst. This decantation treatment was repeated three times, and the solvent replacement was completed. The gelled compound was subjected to high pressure media-less pulverizing (homogenizer (product name: UH-50, product of SMT Corporation)), thereby preparing a sol liquid. 0.031 parts by mass of an isopropyl alcohol (IPA) solution containing 1.5 wt % photobase generation catalyst (product of Wako Pure Chemical Industries, Ltd., product name: WPBG 266) was added to 0.75 parts by mass of sol particle liquid, and 0.018 parts by mass of 5% bis(trimethoxysilyl) ethane was added thereto, thereby preparing a coating liquid. Then, by applying the coating liquid to the surface of a polyethylene terephthalate base (resin film), a coating film was formed. The coating film was treated at 100° C. for 1 minute and then dried, thereby obtaining a silicone porous body film having a thickness of 1 μm. Thereafter, the porous body film was irradiated with UV (350 mJ/cm$^2$ (@360 nm)) and then subjected to thermal aging at 60° C. for 20 hours, thereby obtaining a void-provided layer.

Reference Example 2: Formation of Void-Provided Layer 13 parts by mass of water was added to 20 parts by mass of alumina sol liquid (concentration: 4.9%, product of Kawaken Fine Chemicals Co., Ltd.), the resultant was heated at 80° C., and 3 parts by mass of NH$_3$ was added thereto. Then, heating at 80° C. was further performed for 10 hours, thereby obtaining a gelled compound. A low refractive index void-provided layer having a refractive index of 1.24 was obtained in the same manner as in Reference Example 1 except that the thus obtained gelled compound was used instead of the gelled compound of Reference Example 1.

Reference Example 3: Formation of Void-Provided Layer n-hexadecyltrimethylammonium chloride and urea were dissolved in a cellulose nanofiber sol liquid (concentration: 2%, product of SUGINO MACHINE LIMITED) and MTMS was added thereto to hydrolyze. Then, heating at 60° C. was performed for 20 hours, thereby obtaining a gelled compound. A low refractive index void-provided layer having a refractive index of 1.20 was obtained in the same manner as in Reference Example 1 except that the thus obtained gelled compound was used instead of the gelled compound of Reference Example 1.

Reference Example 4: Formation of Void-Provided Layer

A low refractive index void-provided layer having a refractive index of 1.19 was obtained in the same manner as in Reference Example 1 except that a dispersion liquid of needle silica gel IPA-ST-UP (product of NISSAN CHEMICAL INDUSTRIES, LTD.) was used instead of the gelled compound of Reference Example 1.

Example 1

A cover layer composition aqueous solution (cover layer raw material liquid) containing 40 parts by mass of polyvinyl alcohol (product name: JC40: polarization degree 4000) (9% aqueous solution), 60 parts by mass of methyltrimethoxysilane, 15 parts by mass of urea, and 4 parts by mass of BYK333 (product name) was applied to the void-provided layer obtained in Reference Example 1, and the resultant was dried by heating at 100° C. for 4 minutes. Then, the aging treatment at 60° C. was performed for 20 hours, thereby obtaining a laminated optical film. This laminated optical film was a laminated optical film in which the void-provided layer is formed on the polyethylene terephthalate base (resin film) and the cover layer having a thickness of him is formed directly on the void-provided layer. The evaluation results of this laminated optical film are summarized in Table 1.

Example 2

A laminated optical film was obtained in the same manner as in Example 1 except that VC-10 (product name) having a polarization degree of 1000 was used instead of JC40 as polyvinyl alcohol of a cover layer raw material liquid. The evaluation results of this laminated optical film are summarized in Table 1.

Example 3

A laminated optical film was obtained in the same manner as in Example 1 except that the amount of the polyvinyl alcohol of the cover layer raw material liquid was changed to 30 parts by mass and the amount of the methyltrimethoxysilane of the cover layer raw material liquid was changed to 70 parts by mass. The evaluation results of this laminated optical film are summarized in Table 1.

Example 4

A laminated optical film was obtained in the same manner as in Example 1 except that the amount of the polyvinyl alcohol of the cover layer raw material liquid was changed to 70 parts by mass and the amount of the methyltrimethoxysilane of the cover layer raw material liquid was changed to 30 parts by mass. The evaluation results of this laminated optical film are summarized in Table 1.

Example 5

A laminated optical film was obtained in the same manner as in Example 1 except that 7 parts by mass of β-picoline was used instead of urea of the cover layer raw material liquid. The evaluation results of this laminated optical film are summarized in Table 1.

Example 6

A laminated optical film was obtained in the same manner as in Example 1 except that the composition of the cover layer raw material liquid was changed to 95 parts by mass of polyester polyol urethan polymer (17.5% aqueous solution) (product name: x-7096, product of NICCA CHEMICAL CO., LTD.), 5 parts by mass of methyltrimethoxysilane, 3 parts by mass of urea, and 4 parts by mass of BYK3500 (product name). The evaluation results of this laminated optical film are summarized in Table 1.

Example 7

A laminated optical film was obtained in the same manner as in Example 1 except that the cation self-crosslinking type nanoemulsion (product name: UW-550CS, product of TAISEI FINE CHEMICAL CO, LTD.) was used instead of the cover layer raw material liquid. The evaluation results of this laminated optical film are summarized in Table 1.

Example 8

A laminated optical film was obtained in the same manner as in Example 1 except that 7 parts by mass of β-picoline was used instead of urea of the cover layer raw material liquid. The evaluation results of this laminated optical film are summarized in Table 1.

Example 9

A laminated optical film was obtained in the same manner as in Example 1 except that the void-provided layer obtained in Reference Example 2 was used instead of the void-provided layer obtained in Reference Example 1. The evaluation results of this laminated optical film are summarized in Table 1.

Example 10

A laminated optical film was obtained in the same manner as in Example 1 except that the void-provided layer obtained in Reference Example 3 was used instead of the void-provided layer obtained in Reference Example 1. The evaluation results of this laminated optical film are summarized in Table 1.

Example 11

A laminated optical film was obtained in the same manner as in Example 1 except that the void-provided layer obtained in Reference Example 4 was used instead of the void-provided layer obtained in Reference Example 1. The evaluation results of this laminated optical film are summarized in Table 1.

Comparative Example 1

The void-provided layer obtained in Reference Example 1 was evaluated without forming the cover layer thereon. The evaluation results are summarized in Table 1.

Comparative Example 2

The void-provided layer obtained in Reference Example 2 was evaluated without forming the cover layer thereon. The evaluation results are summarized in Table 1.

Comparative Example 3

The void-provided layer obtained in Reference Example 4 was evaluated without forming the cover layer thereon. The evaluation results are summarized in Table 1.

Comparative Example 4

A composition liquid containing a cyclohexane solution (40% solution) of 100 parts by mass of methyltrimethoxysilane and 10 parts by mass of Ti catalyst (product name: TA-25, product of Matsumoto Fine Chemical Co. Ltd.) was applied to the void-provided layer obtained in Reference Example 1, and the resultant was dried by heating at 100° C. for 4 minutes to form a cover layer, thereby obtaining a laminated optical film. This laminated optical film was a laminated optical film in which the void-provided layer is formed on the polyethylene terephthalate base (resin film) and the cover layer having a thickness of him is formed directly on the void-provided layer. The evaluation results of this laminated optical film are summarized in Table 1.

Comparative Example 5

A composition liquid containing 80 parts by mass of alicyclic epoxy monomer (product name: CELLOXIDE, product of Daicel Corporation), 20 parts by mass of oxetane monomer (product name: OXT-221, product of TOAGOSEI CO., LTD.), and 4 parts by mass of photo cationic initiator (product name: CP-101A, product of San-Apro Ltd.) was applied to the void-provided layer obtained in Reference Example 1, and the resultant was irradiated with UV (1000 mJ) to form a cover layer, thereby obtaining a laminated optical film. This laminated optical film was a laminated optical film in which the void-provided layer is formed on the polyethylene terephthalate base (resin film) and the cover layer having a thickness of him is formed directly on the void-provided layer. The evaluation results of this laminated optical film are summarized in Table 1. The "abrasion resistance" in Table 1 indicates the abrasion resistance of the cover layer. The "refractive index" and the "proportion of void space" in Table 1 indicate the refractive index and the proportion of void space of the void-provided layer. The "contact angle" in Table 1 indicates the contact angle with water of the void-provided layer. The proportion of void space of the void-provided layer and the contact angle with water of the void-provided layer were measured by the method as described above. The refractive index of the void-provided layer and the abrasion resistance of the cover layer were measured by the evaluation method (measurement method) below.

(Evaluation Method)

[Refractive Index]

A void-provided layer (the void-provided layer of the present invention) was formed on an acrylic film, the obtained laminate was cut into a piece having a size of 50 mm×50 mm, and the obtained piece was adhered on the front surface of a glass plate (thickness: 3 mm) through a pressure-sensitive adhesive layer. The center of the back surface of the glass plate (diameter: about 20 mm) was solidly painted with a black magic marker, thereby preparing a sample which allows no reflection at the back surface of the glass plate. The sample was set to an ellipsometer (product of J. A. Woollam Japan, product name: VASE), the refractive index was measured at the wavelength of 500 nm and at the incidence angle of 50° to 80°, and the average value was assumed as a refractive index.

[Abrasion Resistance]

The steel wool test was performed (φ25 mm, 100 g (load)×10 (reciprocation)), and scratches were visually checked.

TABLE 1

|  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| Refractive index | 1.16 | 1.16 | 1.16 | 1.16 | 1.16 | 1.16 | 1.16 | 1.16 | 1.24 |
| Abrasion resistance | No scratches | No scratches | No scratches | No scratches | No scratches | No scratches | No scratches | No scratches | No scratches |
| Contact angle | 130° | 130° | 130° | 130° | 130° | 130° | 130° | 130° | 90° or more |
| Proportion of void space | 59% | 59% | 59% | 59% | 59% | 59% | 59% | 59% | 40% |

TABLE 1-continued

| | Ex. 10 | Ex. 11 | Comp. Ex. 1 | Comp. Ex. 2 | Comp. Ex. 3 | Comp. Ex. 4 | Comp. Ex. 5 |
|---|---|---|---|---|---|---|---|
| Refractive index | 1.20 | 1.19 | 1.16 | 1.24 | 1.17 | Cover layer composition liquid penetrates void-provided layer and void spaces vanish | Cover layer composition liquid penetrates void-provided layer and void spaces vanish |
| Abrasion resistance | No scratches | No scratches | Some scratches | Some scratches | Some scratches | — | — |
| Contact angle | 90° or more | 100° | 130° | 90° or more | 90° or more | 130° | 130° |
| Proportion of void space | 52% | 53% | 59% | 40% | 57% | 0% | 0% |

As summarized in Table 1, according to each of Examples of the present invention, a laminated optical film achieving both a high proportion of void space (porosity) and superior abrasion resistance can be obtained. The proportion of void space of the cover layer of each of Examples 1 to 11 was measured in the same manner as the proportion of void space of the void-provided layer. The proportion of void space of the cover layer of each of Examples 1 to 11 was 10 vol % or less.

INDUSTRIAL APPLICABILITY

As described above, the laminated optical film of the present invention achieves both a high proportion of void space (porosity) and superior abrasion resistance. According to the production method of a laminated optical film of the present invention, the laminated optical film of the present invention achieving both a high proportion of void space (porosity) and superior abrasion resistance can be produced. The laminated optical film of the present invention may be used for an optical element and an image display of the present invention, for example. The present invention, however, is not limited thereto and can be used for any purpose.

EXPLANATION OF REFERENCE NUMERALS 10 base
void-provided layer
20' coating film (after drying)
20" sol particle liquid
void-provided layer with improved strength
22 cover layer
22' coating film (after drying)
22" cover layer raw material liquid
cover layer with improved strength
101 delivery roller
102 coating roller
105 winding roller
106 roller
110 oven zone
111 hot air fan (heating unit)
120 chemical treatment zone
121 lamp (light irradiation unit) or hot air fan (heating unit)
130 strength improving zone
131 hot air fan (heating unit)
140 cover layer coating zone
141 cover layer coating unit
150 oven zone
151 heating unit
160 chemical treatment zone
161 heating unit
170 strength improving zone
171 heating unit
201 delivery roller
202 liquid reservoir
203 doctor (doctor knife)
204 micro-gravure
210 oven zone
211 hot air fan (heating unit)
220 chemical treatment zone
221 lamp (light irradiation unit) or hot air fan (heating unit)
230 strength improving zone
231 hot air fan (heating unit)
240 cover layer coating zone
241 cover layer coating unit
250 oven zone
251 heating unit
260 chemical treatment zone
261 heating unit
270 strength improving zone
271 heating unit
351 winding roller

The invention claimed is:
1. A laminated optical film comprising:
a void-provided layer;
a resin film; and
a cover layer, wherein:
the void-provided layer is formed on the resin film,
the cover layer having a thickness of from 50 to 10,000 nm is formed directly on the void-provided layer,
the void-provided layer has a contact angle with water of 90° or more, and a proportion of void spaces of 30 vol % or more such that the void spaces of the void-provided layer are not filled with the cover layer,
the void-provided layer is a porous body in which microporous particles are chemically bonded to each other,
the cover layer is porous with a proportion of void spaces of 10 vol % or less,
the cover layer contains a water-soluble polymer, and a water-soluble silane crosslinked product formed from at least one of monomers and oligomers of water-soluble alkoxysilane, said monomers and/or oligomers of water-soluble alkoxysilane of the cover layer chemically bonded to the microporous particles of the void-provided layer, and
after the steel wool test on the cover layer (φ25 mm, 100 g (load)×10 (reciprocation)), no scratch was found by visual observation.

2. The laminated optical film according to claim 1, wherein the cover layer is a layer having an abrasion resistance.

3. The laminated optical film according to claim 1, wherein the void-provided layer has a refractive index of 1.3 or less.

4. The laminated optical film according to claim 1, wherein the void-provided layer further includes structural units selected from the group consisting of a particle, a fiber, a plate, and any combinations thereof, wherein the structural units are chemically bonded directly or indirectly with minute void spaces formed between adjacent structural units, and wherein the void-provided layer contains a crosslinking assisting agent for indirectly bonding the structural units.

5. The laminated optical film according to claim 4, wherein a content of the crosslinking assisting agent in the void-provided layer relative to a weight of the structural unit is in a range from 0.01 wt % to 20 wt %.

6. An optical element comprising: the laminated optical film according to claim 1.

7. An image display comprising: the optical element according to claim 6.

8. The laminated optical film according to claim 1, wherein the microporous particles are chemically bonded to each other by a catalysis of a catalyst.

9. The laminated optical film according to claim 8, wherein the microporous particle includes a pulverized product of a gelled silica compound.

10. The laminated optical film according to claim 1, wherein the microporous particle includes a pulverized product of a gelled silica compound.

11. The laminated optical film according to claim 1, wherein the cover layer has a proportion of void spaces of 9 vol % or less.

12. The laminated optical film according to claim 1, wherein the cover layer has a proportion of void spaces of 8 vol % or less.

* * * * *